United States Patent
Turner

(10) Patent No.: US 9,205,869 B2
(45) Date of Patent: Dec. 8, 2015

(54) SYSTEM AND METHOD FOR DETERMINING A STEERING ANGLE FOR A VEHICLE AND SYSTEM AND METHOD FOR CONTROLLING A VEHICLE BASED ON SAME

(75) Inventor: Steven Paul Turner, Marysville, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 955 days.

(21) Appl. No.: 13/248,677

(22) Filed: Sep. 29, 2011

(65) Prior Publication Data
US 2012/0041658 A1 Feb. 16, 2012

Related U.S. Application Data

(63) Continuation-in-part of application No. 12/857,359, filed on Aug. 16, 2010, now Pat. No. 8,825,295.

(51) Int. Cl.
*B63G 8/20* (2006.01)
*B62D 15/02* (2006.01)
*B60W 10/20* (2006.01)

(52) U.S. Cl.
CPC .............. *B62D 15/024* (2013.01); *B60W 10/20* (2013.01); *B62D 15/02* (2013.01); *B62D 15/021* (2013.01); *B62D 15/0215* (2013.01); *B62D 15/0245* (2013.01)

(58) Field of Classification Search
CPC .. B62D 12/02; B62D 15/021; B62D 15/0215; B62D 15/024; B62D 15/0245; B62D 15/02; B60W 10/20
USPC .............. 701/41, 43, 30.5, 30.7, 30.8; 702/87
See application file for complete search history.

(56) References Cited

U.S. PATENT DOCUMENTS

| | | | |
|---|---|---|---|
| 4,630,704 A | 12/1986 | Yamakawa et al. | |
| 4,768,609 A | 9/1988 | Taga et al. | |
| 4,856,607 A | 8/1989 | Sueshige et al. | |
| 5,020,626 A | 6/1991 | Kodama | |
| 5,121,322 A | 6/1992 | Shiraishi et al. | |
| 5,311,432 A | 5/1994 | Momose | |
| 5,465,210 A | 11/1995 | Walenty | |
| 5,732,372 A * | 3/1998 | Marsden | 701/41 |
| 5,787,375 A | 7/1998 | Madau et al. | |
| 5,828,973 A | 10/1998 | Takeuchi et al. | |
| 6,041,884 A * | 3/2000 | Shimizu et al. | 180/443 |
| 6,056,666 A | 5/2000 | Williams | |
| 6,089,344 A | 7/2000 | Baughn et al. | |
| 6,101,434 A | 8/2000 | Irie et al. | |
| 6,208,921 B1 | 3/2001 | Tsunehara et al. | |
| 6,213,242 B1 | 4/2001 | Rodrigues et al. | |

(Continued)

*Primary Examiner* — Thomas G Black
*Assistant Examiner* — Sze-Hon Kong
(74) *Attorney, Agent, or Firm* — Kenealy Vaidya LLP

(57) ABSTRACT

A system for determining an angular position of a steerable wheel of a vehicle can include a plurality of sensors and a controller in electrical communication with each of these sensors. The controller can be configured to compare a first data set and a second data set to respective straight path conditions, wherein the first data set includes data from a first set of the sensors and the second data includes data from a second set of the sensors. The controller can be configured to determine a substantially straight path of travel condition when the comparison of at least one of the first data set and the second data set satisfies the respective straight path conditions, and can then associate that data acquired from the steering angle sensor(s) with a neutral position.

30 Claims, 7 Drawing Sheets

| First Straight Judgment | |
|---|---|
| 1. | Front slip ratio < slip threshold<br>Rear slip ratio < slip threshold<br>Front to rear slip ratio < slip threshold |
| 2. | Front axle acceleration < acceleration threshold |
| 3. | $a_{sensor}$ < lateral threshold |
| 4. | $Y_{sensor}$ < yaw threshold |
| 5. | Minimum wheel speed > speed threshold |

| Second Straight Judgment | |
|---|---|
| 1. | $\delta_V$ < angle threshold |
| 2. | $\delta_Y$ < angle threshold |
| 3. | $\delta_Y + \delta_V$ < angle threshold |
| 4. | $V_{max} - V_{min}$ < velocity threshold |
| 5. | maximum threshold > $V_{RL}, V_{RR}$ > minimum threshold |

(56) References Cited

U.S. PATENT DOCUMENTS

| | | | | |
|---|---|---|---|---|
| 6,240,349 | B1 | 5/2001 | Nishimoto et al. | |
| 6,466,848 | B2 | 10/2002 | Ozaki | |
| 6,498,971 | B2* | 12/2002 | Leaphart | 701/41 |
| 6,549,840 | B1 | 4/2003 | Mikami et al. | |
| 6,560,518 | B1 | 5/2003 | Ashrafi et al. | |
| 6,574,539 | B1 | 6/2003 | Ashrafi | |
| 6,691,818 | B2 | 2/2004 | Endo et al. | |
| 6,697,725 | B1 | 2/2004 | Williams | |
| 6,729,432 | B1 | 5/2004 | Yao et al. | |
| 6,789,017 | B2* | 9/2004 | Aanen et al. | 701/41 |
| 6,816,799 | B2 | 11/2004 | Yu et al. | |
| 6,856,869 | B2 | 2/2005 | Takahashi | |
| 6,856,886 | B1* | 2/2005 | Chen et al. | 701/70 |
| 6,895,318 | B1 | 5/2005 | Barton et al. | |
| 6,895,357 | B2* | 5/2005 | Lou et al. | 702/151 |
| 6,922,617 | B2 | 7/2005 | Kogure et al. | |
| 6,928,352 | B2 | 8/2005 | Yao et al. | |
| 7,099,759 | B2 | 8/2006 | Ghoneim | |
| 7,130,729 | B2 | 10/2006 | Shin et al. | |
| 7,343,998 | B2 | 3/2008 | Morin et al. | |
| 7,349,776 | B2 | 3/2008 | Spillane et al. | |
| 7,383,112 | B2 | 6/2008 | Shin et al. | |
| 7,440,829 | B2 | 10/2008 | Hara | |
| 7,455,134 | B2 | 11/2008 | Severinsky et al. | |
| 7,458,917 | B2 | 12/2008 | Yoshikawa et al. | |
| 7,549,497 | B2 | 6/2009 | Homan et al. | |
| 8,165,756 | B2* | 4/2012 | Yasui et al. | 701/42 |
| 8,234,044 | B2* | 7/2012 | Matsuno et al. | 701/42 |
| 8,326,491 | B2* | 12/2012 | Gartner | 701/42 |
| 8,364,348 | B2* | 1/2013 | Zell et al. | 701/41 |
| 8,428,822 | B2* | 4/2013 | Shartle et al. | 701/41 |
| 8,433,477 | B2* | 4/2013 | Mukai et al. | 701/41 |
| 8,571,758 | B2* | 10/2013 | Klier et al. | 701/41 |
| 2004/0029673 | A1 | 2/2004 | Lipman | |
| 2004/0099459 | A1 | 5/2004 | Nakasako et al. | |
| 2005/0004732 | A1 | 1/2005 | Berry et al. | |
| 2005/0043874 | A1 | 2/2005 | Chen et al. | |
| 2005/0103561 | A1 | 5/2005 | Endo et al. | |
| 2005/0216146 | A1 | 9/2005 | Bauer et al. | |
| 2005/0216157 | A1* | 9/2005 | Sakata | 701/42 |
| 2006/0041358 | A1 | 2/2006 | Hara | |
| 2007/0203627 | A1 | 8/2007 | Bolzmann et al. | |
| 2007/0260388 | A1 | 11/2007 | Watanabe | |
| 2008/0035411 | A1 | 2/2008 | Yamashita et al. | |
| 2008/0281489 | A1* | 11/2008 | Le Vourch | 701/41 |
| 2009/0043443 | A1 | 2/2009 | Wei et al. | |
| 2009/0099762 | A1 | 4/2009 | Heinzmann et al. | |
| 2009/0112406 | A1 | 4/2009 | Fujii et al. | |
| 2009/0118905 | A1* | 5/2009 | Takenaka et al. | 701/41 |
| 2009/0173566 | A1 | 7/2009 | Ogasawara | |
| 2009/0240389 | A1 | 9/2009 | Nomura et al. | |
| 2009/0287375 | A1 | 11/2009 | Lavoie et al. | |
| 2010/0004825 | A1 | 1/2010 | Nakano et al. | |
| 2010/0235052 | A1* | 9/2010 | Shartle et al. | 701/41 |
| 2010/0241314 | A1* | 9/2010 | Bohm et al. | 701/41 |

* cited by examiner

Fig. 5

| First Straight Judgment | |
|---|---|
| 1. | Front slip ratio < slip threshold<br>Rear slip ratio < slip threshold<br>Front to rear slip ratio < slip threshold |
| 2. | Front axle acceleration < acceleration threshold |
| 3. | $a_{sensor}$ < lateral threshold |
| 4. | $Y_{sensor}$ < yaw threshold |
| 5. | Minimum wheel speed > speed threshold |
| Second Straight Judgment | |
| 1. | $\delta_Y$ < angle threshold |
| 2. | $\delta_Y$ < angle threshold |
| 3. | $\delta_Y + \delta_Y$ < angle threshold |
| 4. | $V_{max} - V_{min}$ < velocity threshold |
| 5. | maximum threshold > $V_{RL}, V_{RR}$ > minimum threshold |

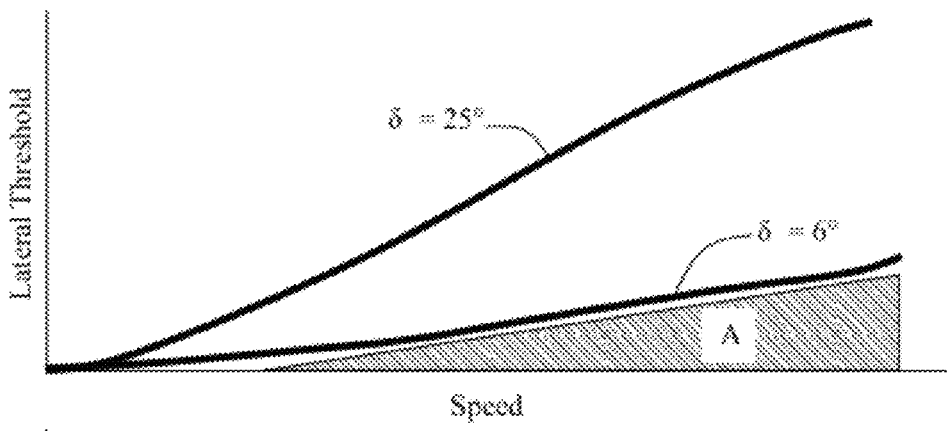

Fig. 6

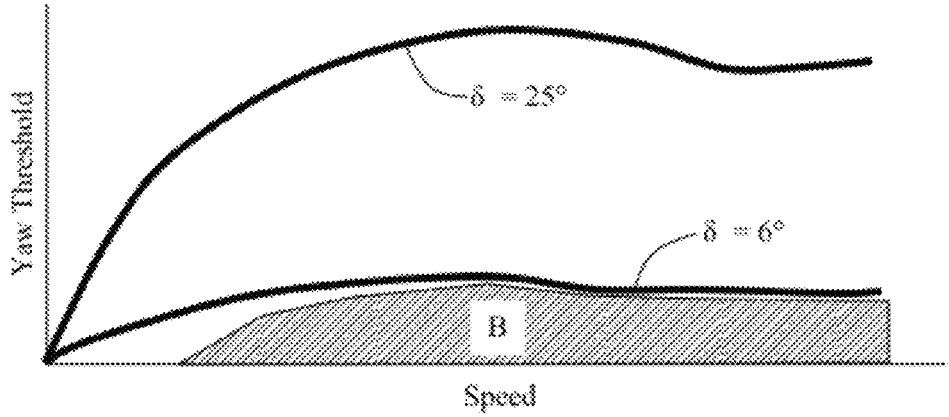

Fig. 7

SYSTEM AND METHOD FOR DETERMINING A STEERING ANGLE FOR A VEHICLE AND SYSTEM AND METHOD FOR CONTROLLING A VEHICLE BASED ON SAME

CROSS REFERENCE TO RELATED APPLICATIONS

This application claims the priority benefit under 35 U.S.C. §120 and is a continuation-in-part of U.S. patent application Ser. No. 12/857,359 filed on Aug. 16, 2010 now U.S. Pat. No. 8,825,295.

BACKGROUND

1. Field

The presently disclosed subject matter relates to devices, systems, and processes useful as an assistance feature to supplement an operator's control input to a vehicle.

2. Description of the Related Art

Vehicles have typically included a system(s) that assists an operator's input for the control of the vehicle. This assistance can supplement the operator's control of the vehicle to enhance comfort for the operator/passenger(s) and/or to enhance dynamic performance of the vehicle. Examples of an operator assistance system can include, but are not limited to, power steering systems, anti-lock braking systems (ABS), traction control systems (TCS), and stability assistance systems (aka, VSA, VSC or ESP)—which can be, active suspension systems, all-wheel drive systems (AWD) and four-wheel steering systems (4ws). Some of these operator assistance systems can signal the operator to alter their input through visual, aural or tactile notification. Examples of these systems can include, but are not limited to, active braking systems, lane departure warning systems, parking assistance systems and obstacle avoidance systems. Each of these operator assistance systems are generally known in the art.

The operator assistance system can include a controller—also called an electronic control unit (ECU) or a central processing unit (CPU)—at least one sensor, and at least one actuator in electrical communication with the ECU. The ECU often relies on data generated by a steering angle sensor so that the ECU can interpret the operator's input and send an appropriate signal(s) to the appropriate actuator(s) to supplement the operator's input.

In many of these operator assistance systems, it can be advantageous for the ECU to rely on data from the steering angle sensor to determine whether the operator is attempting to steer the vehicle to the left or to the right relative to a neutral position, as well as to determine the magnitude of the directional change (relative to the neutral position) intended by the operator. Typically, the neutral position corresponds to the position of the steering system components and the steering angle sensor when the vehicle travels along a substantially straight path. It is known in the art to position the steering angle sensor within the steering system of the vehicle such that the steering angle sensor can detect the operator's steering input. The steering angle sensor can be an absolute position or a relative position sensor. Both types of steering sensors and their implementation are known in the art.

An absolute position sensor can indicate, at any time, the position of the steering wheel relative to the neutral position. As a result, an absolute steering position sensor can be a complicated device and can be expensive to produce. Further, in some of these operator assistance systems, it may be unnecessary to determine the neutral position for appropriate operation of the system. Thus, an absolute position sensor can increase the cost and/or complexity of the operator assistance system with no corresponding benefit.

In contrast, a relative position sensor can be less complex in design and less costly compared to an absolute position sensor. However, a relative position sensor can detect only a change in position of the steering wheel relative to the previously detected position. Thus, the raw sensor data can neither indicate the direction relative to the neutral position to which the operator has turned the steering wheel nor indicate how far from the neutral position the operator has turned the steering wheel. In order to translate the raw sensor data into absolute position data, additional electronic circuitry and/or software can be provided in the sensor assembly, or in the ECU, so that the neutral position can be determined either by the sensor or the ECU. This additional circuitry can offset or exceed the cost and/or the complexity advantage(s) that the relative position sensor can have over an absolute position sensor.

Operator assistance systems known in the art that employ a relative position sensor and also rely on determination of the neutral position typically do not store the neutral position of the steering angle sensor after the vehicle is shut down. Thus, the neutral position determination algorithm is performed each time the vehicle is started. Operation of this algorithm can be dependent on a particular travel path(s) taken by the vehicle. As such, it can take a finite period of time to complete. Thus, the vehicle assistance system can be rendered ineffective prior to completion of the neutral position determination algorithm.

There is, and has been, a need to provide a system and method that can obtain and process real-time data indicative of the operator's steering direction input (i.e., left or right) and the magnitude of the steering input (i.e., how far from neutral the driver has rotated the steering wheel) via a relative position sensor as close to vehicle start-up as possible, where the system and method are relatively simple in design and have a minimum cost.

In order to provide the operator assistance system utilizing a relative position steering angle sensor with relevant steering angle data, there is a need to provide an estimated steering angle that can approximate the actual angle of the steerable wheel(s) of the vehicle until the neutral position algorithm is complete.

Further, a failure of the steering sensor or interruption of data from the sensor can cause the operator input assistance system to shut down (or otherwise be impaired to a certain degree) until the failure or interruption is resolved, thereby canceling the assistance to the operator's input. Thus, there is a need to provide a failure mode where the steering angle can be approximated from at least one other vehicle dynamic sensor so that the operator input assistance system can operate in a sufficient manner despite a failure of the steering angle sensor.

SUMMARY

According to one aspect of the disclosure a system for determining an angular position of a pair of steerable wheels of a vehicle having a plurality of wheels can include a relative position steering angle sensor, a yaw rate sensor, a lateral acceleration sensor and a plurality of speed sensors. The relative position steering angle sensor can be configured to output data indicative of a change in position of the pair of steerable wheels. The yaw rate sensor can be configured to output data indicative of an angular velocity of the vehicle about a vertical axis of the vehicle. The lateral acceleration sensor configured to output data indicative of an acceleration of the vehicle in a substantially transverse direction of the vehicle. Each wheel speed sensor can be configured to output data indicative of a rotational velocity of a respective one of the plurality of wheels. The controller can be in electrical communication with each of the pair of wheel speed sensors, the lateral acceleration sensor, and the yaw rate sensor. The controller can be configured to: compare a first data set and a second data set to respective straight path conditions, wherein the first data set includes data from the yaw rate sensor and data from the lateral acceleration sensor and the second data includes data from the plurality of wheel speed sensors; determine a substantially straight path of travel condition when the comparison of at least one of the first data set and the second data set satisfies the respective straight path conditions; and associate data acquired from the steering angle sensor with a neutral position when the controller determines the substantially straight path of travel condition.

According to another aspect of the disclosed subject matter, a method for determining a steering angle of a pair of steerable wheels of a vehicle having a plurality of wheels can include: comparing a first data set and a second data set to respective straight path conditions, wherein the first data set includes data from a yaw rate sensor and data from a lateral acceleration sensor and the second data includes data from a plurality of wheel speed sensors; determining a substantially straight path of travel condition when the comparison of at least one of the first data set and the second data set satisfies the respective straight path conditions; and associating data acquired from a steering angle sensor with a neutral position when the controller determines the substantially straight path of travel condition.

According to still another aspect of the disclosed subject matter, a control system for an all-wheel drive powertrain of a vehicle having a power source configured to produce torque, a steerable pair of wheels configured to be driven by the torque, and a second pair of wheels configured to be selectively driven by the torque, the control system can include a first clutch assembly, a second clutch assembly, a yaw rate sensor, a lateral acceleration sensor, a plurality of wheel speed sensors, and a controller. The first clutch assembly can be selectively connecting a first wheel of the second pair of wheels to the power source. The second clutch assembly can be selectively connecting a second wheel of the second pair of wheels to the power source. The yaw rate sensor can be configured to output data representative of an angular velocity of the vehicle about a vertical axis of the vehicle. The lateral acceleration sensor can be configured to output data indicative of an acceleration of the vehicle in a substantially transverse direction of the vehicle. Each wheel speed sensor can be configured to output data indicative of a rotational velocity of a respective one of the plurality of wheels. The controller can be in electrical communication with each of the sensors and the first and second clutch assemblies. The controller can be configured to: determine a neutral position for the steering angle sensor; determine an estimated steering angle until the controller determines the neutral position; modulate the clutches according to the data from the steering angle sensor after the controller determines neutral position; and modulate the clutches according to the estimated steering angle until the controller determines the neutral position.

According to yet another aspect of the disclosed subject matter, a method for controlling an on-demand all-wheel drive system of a vehicle to supplement an operator's input to the vehicle comprising: providing a power source, a pair of steerable wheels driven by the power source, a pair of rear wheels selectively driven by the power source, a pair of rear clutch assemblies selectively connecting a respective one of the pair of rear wheels to the power source, a yaw rate sensor configured to output data representative of an angular velocity of the vehicle about a vertical axis of the vehicle, a lateral acceleration sensor configured to output data indicative of an acceleration of the vehicle in a substantially transverse direction of the vehicle, and a plurality of wheel speed sensors configured to output data representative of a rotational speed of a respective one of the pair of steerable wheels and the pair of rear wheels; determining a neutral position for the steering angle sensor; determining an estimated steering angle until the neutral position is determined; modulate the clutches according to the data from the steering angle sensor after the neutral position is determined; and modulate the clutches according to the estimated steering angle until the neutral position is determined.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 5 is a table of parameters usable in the algorithm depicted in FIG. 4 to estimate when a vehicle could be traveling along a straight path.

FIG. 6 illustrates graphs of lateral threshold versus speed data usable with the algorithm of FIG. 4.

FIG. 7 illustrates graphs of yaw threshold versus speed data usable with the algorithm of FIG. 4.

DETAILED DESCRIPTION OF EXEMPLARY EMBODIMENTS

Figure 1:
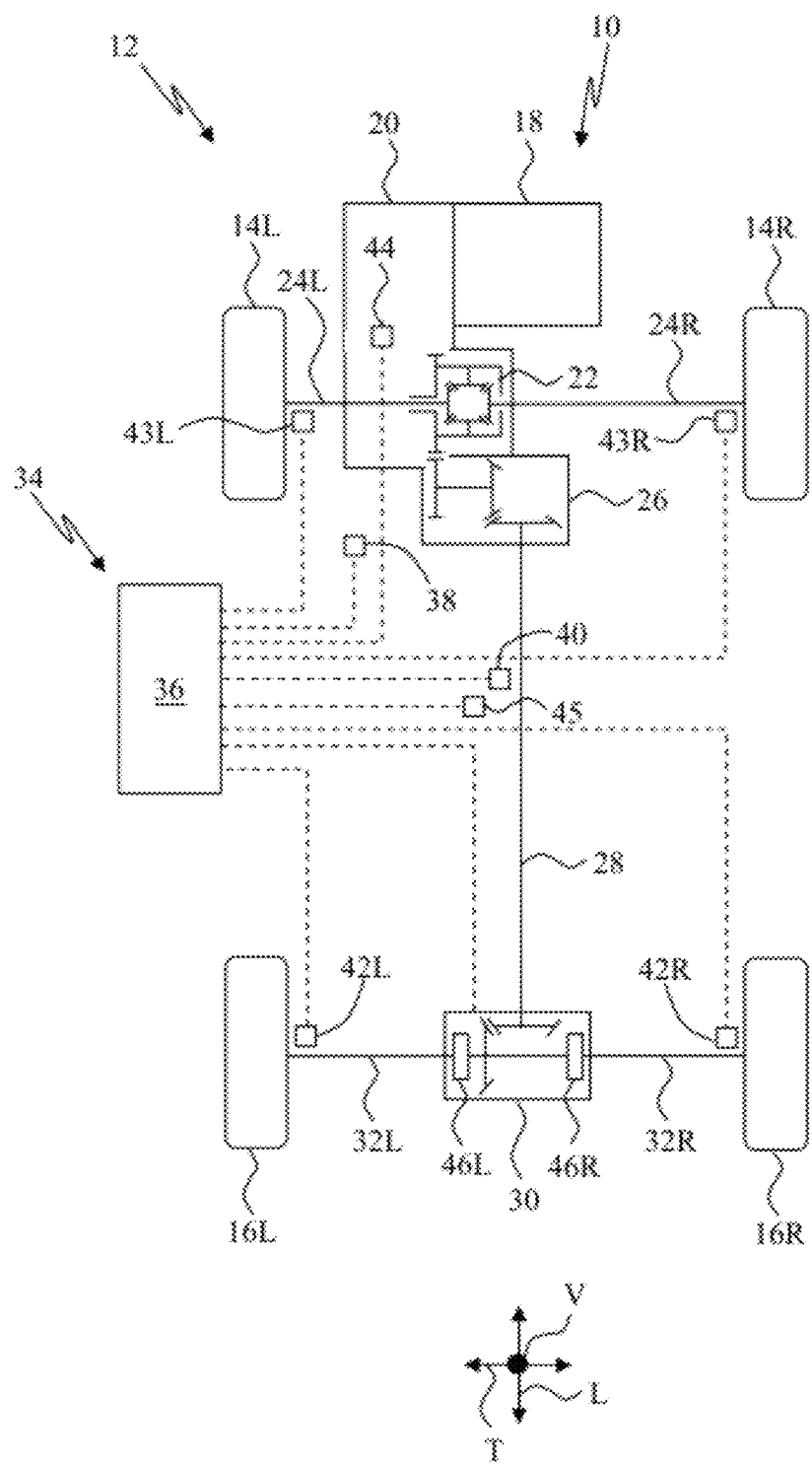
FIG. 1 is a schematic view of an exemplary powertrain for a vehicle made in accordance with principles of the disclosed subject matter.

FIG. 1 illustrates an embodiment of a powertrain 10 for a vehicle 12, where the vehicle 12 has a longitudinal direction L, a transverse (or lateral) direction T perpendicular to the longitudinal direction, and a vertical direction V perpendicular to both the longitudinal direction L and the transverse direction T. The powertrain 10 can be configured as an on-demand, part-time, all-wheel drive system in accordance with the principles of the disclosed subject matter. This exemplary powertrain 10 can be configured such that the steerable front wheels 14L, 14R are the primary drive wheels and the rear wheels 16L, 16R are selectively driven automatically when additional tractive effort is appropriate for the given vehicle conditions. However, the powertrain 10 can be configured such that the rear wheels 16L, 16R are the primary drive wheels and the front wheels 14L, 14R are driven only when additional tractive effort is appropriate. In other embodiments, the powertrain 10 can be configured as: a full-time, all-wheel drive system; a manually-engageable, part-time all-wheel drive system; a front-wheel drive system; or a rear-wheel drive system, all of which are generally known in the art.

The powertrain 10 can include a power source 18, a transmission 20, the pair of front wheels 14L, 14R, the pair of rear wheels 16L, 16R, a front differential assembly 22, a pair of front driveshafts 24L, 24R, a power-take-off assembly 26, a propeller shaft 28, a rear differential assembly 30, a pair of rear driveshafts 32L, 32R and a control system 34 arranged in a manner known in the art.

The control system 34 can be configured to automatically engage/disengage the rear wheels 16L, 16R with the power source 18, as appropriate. An exemplary control system is disclosed in co-pending U.S. patent application Ser. No. 12/847,880, entitled "Control System and Method for Automatic Control of Selection of On-Demand All-Wheel Drive Assembly for A Vehicle Drivetrain", and filed Jul. 30, 2010, which is incorporated herein by reference in its entirety.

The control system 34 also can be configured to determine a steering angle signal, $\delta_{AWD}$, which can correspond with the real-time toe angle of the front wheels 14L, 14R targeted by the vehicle operator and can control the vehicle 12 based on the steering angle signal, $\delta_{AWD}$, in accordance with principles of the disclosed subject matter. The control system 34 can include one or more of a controller 36, a steering angle sensor 38, a yaw rate sensor 40, a pair of rear wheel speed sensors 42L, 42R, a pair of front wheel speed sensors 43L, 43R, a transmission output shaft speed sensor 44, a lateral acceleration sensor 45 and a pair of clutch assemblies 46L, 46R. The controller 36 can be in electrical communication with each of the sensors 38, 40, 42L, 42R, 43L, 43R, 44 and each of the clutch assemblies 46L, 46R. The controller 36 can be referred to as an electronic control unit (ECU) or as a central processing unit (CPU). The pair of clutch assemblies 46L, 46R can be mounted within the rear differential assembly 30.

The steering angle sensor 38 can be a relative position sensor such that the sensor 38 indicates position data relative to the previous position and not relative to a predetermined constant position such as the neutral position of the steering wheel. The steering angle sensor 38 can be located adjacent a component of the steering system (not illustrated) that lies between the steering wheel (not illustrated) and either one of the front wheels 14L, 14R. The steering angle sensor 38 can measure movement of this component when the vehicle operator rotates the steering wheel. For example, the steering angle sensor 38 can lie adjacent the steering column (not illustrated) to detect rotary movement of the steering column. In another example, the steering angle sensor 38 can lie adjacent the steering rack (not illustrated) to detect linear movement of the steering rack. In yet another example, the steering angle sensor 38 can be associated with an electric power steering (EPS) motor (not illustrated) to detect movement of the EPS motor relative to the steering rack. Other configurations of the steering angle sensor 38 are also possible. The data from the steering angle sensor 38 can be processed by the steering angle sensor 38 or by the ECU 36 to determine the steering angle signal, $\delta_{AWD}$. From the steering angle signal, $\delta_{AWD}$, the ECU 36 can determine the operator's intended directional target for the vehicle 12. Further details regarding the determination and usage of the steering angle signal, $\delta_{AWD}$, by the ECU 36 are provided below.

The yaw rate sensor 40 can be mounted on an appropriate portion of the vehicle 12 to detect angular rotation of the vehicle 12 about an axis extending in the vertical direction V. The raw data from the yaw rate sensor 40 can be processed by the yaw rate sensor 40 or by the ECU 36 to indicate an angular velocity of the vehicle 12 about its vertical axis V. Yaw rate sensors and their use in vehicular control systems are generally known in the art.

The wheel speed sensors 42L, 42R can be mounted on an appropriate portion of the vehicle 12 to detect rotation of the respective rear wheel 16L, 16R (or the respective rear driveshaft 32L, 32R) and are generally known in the art. The raw data from the wheel speed sensors 42L, 42R can be processed by one or both of the wheel speed sensors 42L, 42R or by the ECU 36 to indicate a rotational velocity of the respective rear wheels 16L, 16R. The wheel speed sensors 42L, 42R can be any sensor known in the art to provide the appropriate data.

Alternatively, instead of with the ECU 36, the wheels speed sensors 42L, 42R can be in electrical communication with an additional controller (not illustrated) that is different from the ECU 36. This additional controller can be in electrical communication with the ECU 36. This additional controller can be utilized to affect a different control system of the vehicle 12, such as, but not limited to, an anti-lock brake system (not illustrated). This additional controller can be configured to receive processed data from the wheel speed sensors 42L, 42R or to receive the raw data from the wheel speed sensors 42L, 42R and process the raw data to indicate a rotational velocity of the respective wheels 12L, 16R. Then, this additional controller can electrically communicate the processed data to the ECU 36.

The transmission output shaft speed sensor 44 can be adjacent an output shaft (not shown) of the transmission 20. The transmission output shaft speed sensor 44 can detect rotation of the output shaft. The raw data can be processed by the transmission output shaft speed sensor 44 or by the ECU to indicate a rotational velocity of the output shaft and its use is generally known in the art for conversion into a travel velocity of the vehicle. The transmission output shaft speed sensor 44 can be any sensor known in the art to provide the appropriate data.

Alternatively, the output shaft speed sensor 44 can be omitted from the control system 34 and data from the wheel speed sensors 42L, 42R can be used to indicate the travel velocity of the vehicle 12. In this alternate embodiment, the vehicle 12 further can include front wheel speed sensors 43L, 43R. The signals from the wheel speed sensors 42L, 42R, 43L, 43R can be averaged, or they can be subject to a minimum function analysis, or another appropriate process can be employed to determine on which one of the wheel speed sensors 42L, 42R, 43L, 43R to rely. It is also possible assign only one of the sensors 42L, 42R, 43L, 43R to provide data indicative of the vehicle travel velocity. This assignment can be fixed, randomly selectable, or selected based on some operating condition, such as but not limited to, the fault status of each sensor 42L, 42R, 43L, 43R, or the relative magnitudes of the data from each wheel speed sensor 42L, 42R, 43L, 43R, or the turning direction of the vehicle 12, or whether the front wheels 14L, 14R are driving the vehicle 12, or whether the front wheels 14L, 14R and the rear wheels 16L, 16R are driving the vehicle 12.

The lateral acceleration sensor 45 can be mounted on an appropriate portion of the vehicle 12 to sense acceleration of the vehicle 12 in the transverse direction T. The raw data from the lateral acceleration sensor 45 can be processed by the lateral acceleration sensor 45 or by the ECU 36 to indicate an acceleration of the vehicle 12 in the transverse direction T.

Based on data received from any combination of the sensors 38, 40, 42L, 42R, 43L, 43R, 44, 45 and any other inputs known in the art to be appropriate, the ECU 36 can manipulate the clutch assemblies 46L, 46R to vary the distribution of torque from the power source 18 to a respective one of the rear wheels 16L, 16R in a manner that can enhance the performance of the vehicle 12 as it enters, traverses and/or exits a curve, or experiences other driving conditions that warrant operator assistance. That is, the ECU 36 can supplement the steering input to the front wheels 14L, 14R by driving the appropriate one of the rear wheels 16L, 16R (e.g., the outside wheel) with more torque than the other of the rear wheels 16L, 16R (e.g., the inside wheel). Thus, the control system 24 can manipulate torque distribution to the rear wheels 16L, 16R in order to reduce, correct and/or prevent an understeering or oversteering condition of the vehicle 12 as it enters, traverses and/or exits a curve.

Figure 2:
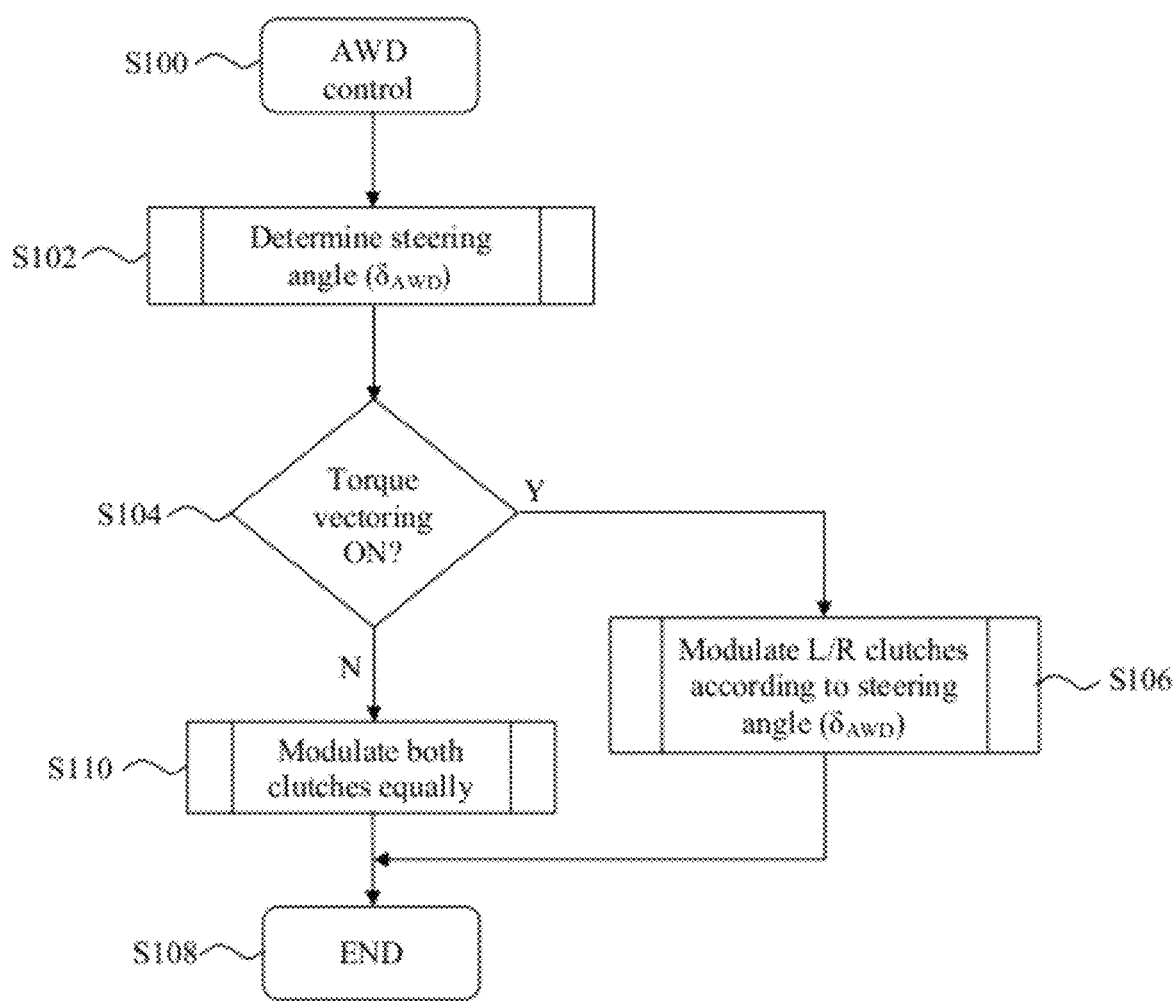
FIG. 2 is a flowchart depicting an exemplary algorithm in accordance with principles of the disclosed subject matter.

FIG. 2 depicts an exemplary algorithm that the ECU 36 can follow to modulate the clutch assemblies 46L, 46R as mentioned above during its control of the all-wheel drive system (AWD). The ECU 36 can begin the AWD control algorithm at step S100. At step S102, the ECU 36 can determine the steering angle signal, $\delta_{AWD}$, based on data received from the array of sensors 38, 40, 42L, 42R, 44. Details of an exemplary determination of the steering angle signal, $\delta_{AWD}$, by the ECU 36 will be explained below with reference to FIGS. 3-5.

After the ECU 36 determines the steering angle signal, $\delta_{AWD}$, the ECU 36 can proceed to step S104 where the ECU 36 can determine whether torque vectoring through the rear wheels 16L, 16R is appropriate for the given dynamic conditions of the vehicle 12. That is, the ECU 36 can determine at step S104 whether to supplement the operator's input to the steering wheel by driving one of the rear wheels 16L, 16R with more torque that the other of the rear wheels 16L, 16R. In general, when the steering angle signal, $\delta_{AWD}$, indicates the neutral position, the ECU 36 can determine that the vehicle 12 is traveling along a substantially straight path or that the operator intends to direct the vehicle along a substantially straight path. When the steering angle signal, $\delta_{AWD}$, does not indicate the neutral position, the ECU 36 can determine that the operator of the vehicle 12 is either attempting to alter the direction in which the vehicle 12 is traveling or the operator is directing the vehicle along a curved path. Thus, the steering angle signal, $\delta_{AWD}$, can be analyzed by the ECU 36 in conjunction with other dynamic data, such as, but not limited to, yaw rate, lateral acceleration, longitudinal acceleration and individual wheel speeds, to determine whether to supplement the driver's steering input with torque vectoring through the wheels 16L, 16R. Torque vectoring control is generally known in the art and will not be further described. An example of this function of the controller 36 can be found in U.S. Patent Application Publication No. 2007/0260388, which is incorporated herein by reference in its entirety.

If the ECU 36 turns on the torque vectoring feature of the control system 34 at step S104, then the ECU 36 can proceed to step S106. At step S106, the ECU 36 can modulate the torque distribution individually through each of the clutch assemblies 46L, 46R such that an appropriate one of the rear wheels 16L, 16R is driven with more torque from the power source 18 than the other of the rear wheels 16L, 16R. The torque differential between the left rear wheel 16L and the right rear wheel 16R can be a function of the steering angle signal, $\delta_{AWD}$, as is generally known in the art—see, for example, U.S. Patent Application Publication No. 2007/0260388, referenced above. The ECU 36 can then proceed to step S108 where ECU 36 can exit the AWD control algorithm.

If the ECU 36 turns off the torque vectoring feature of the control system 34 at step S104, then the ECU 36 can proceed to step S110. At step S110, the ECU 36 can modulate the torque distribution equally through each of the clutch assemblies 46L, 46R such that both rear wheels 16L, 16R are driven with substantially equal torque when no torque modulation or vectoring is applied. The ECU 36 can then proceed to step S108 where ECU 36 can exit the AWD control algorithm.

The determination by the ECU 36 of the steering angle signal, $\delta_{AWD}$, can be assisted by data received from the steering angle sensor 38, which data can indicate to the ECU 36 the operator's targeted direction of travel for the vehicle 12. The steering angle sensor 38 can provide data representative of the direction and magnitude of any movement of the steering wheel by the vehicle operator in real-time. The steering angle sensor 38 can be positioned in appropriate proximity to an appropriate component of the steering system of the vehicle 12 in any manner described above or known in the art.

As discussed above, the steering angle sensor 38 can be an absolute position sensor or a relative position sensor. In this exemplary embodiment, the steering angle sensor 38 can be a relative position sensor 38. As such, the steering angle sensor 38 can provide data that indicates the direction and magnitude of movement from the last position transmitted to the controller 36. Hence, the steering angle sensor 38 does not provide the ECU 36 with sensor position data relative to the neutral position. As will be described in detail below, the ECU 36 or the steering angle sensor 38 can be configured with hardware and/or software to enable the ECU 36 or the steering angle sensor 38 to translate the raw sensor data into data representing the magnitude and direction of the operator's steering input relative to the neutral position.

Figure 3:
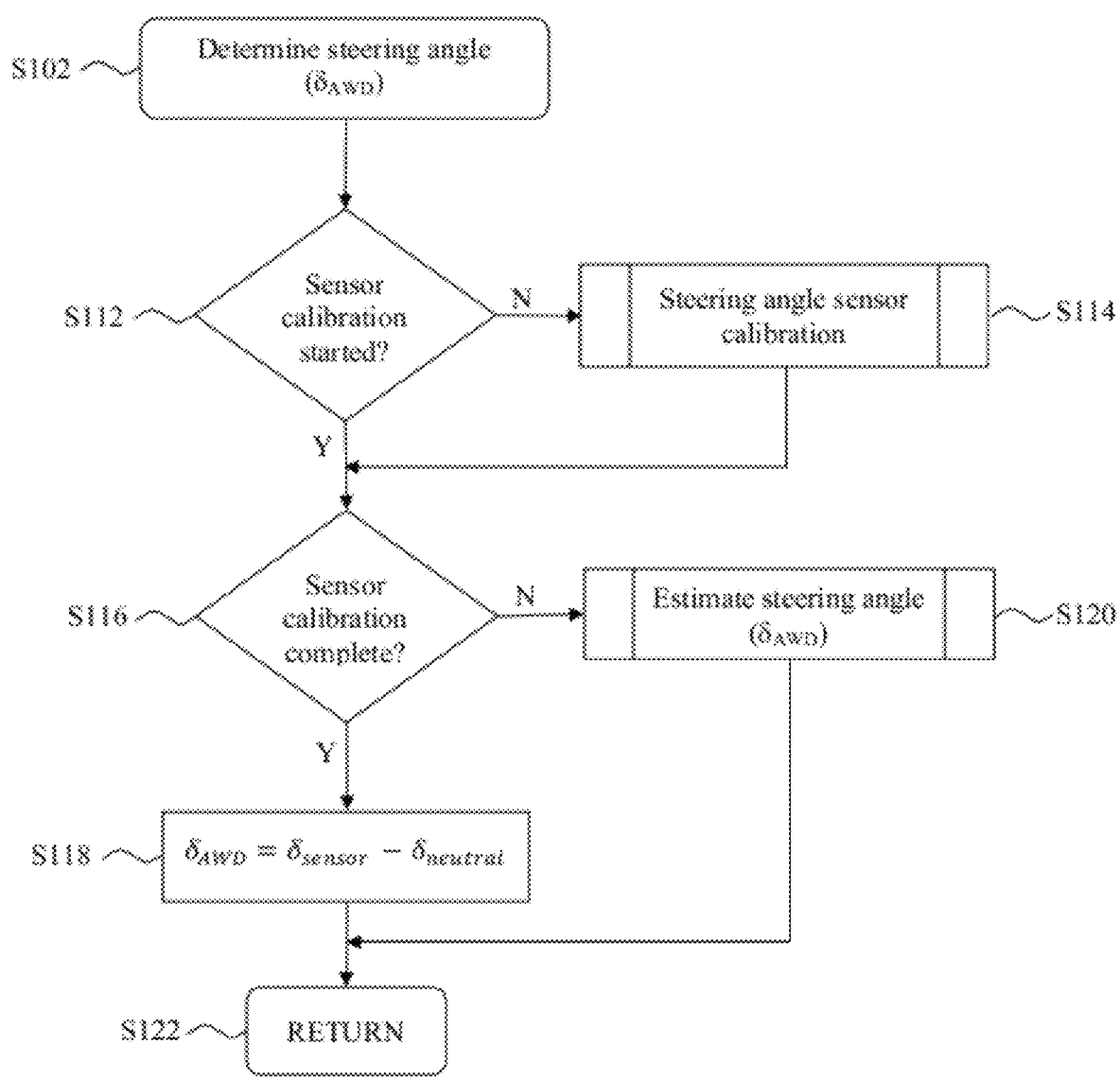
FIG. 3 is a flowchart depicting an exemplary algorithm usable as a subroutine of the algorithm of FIG. 2.

FIG. 3 illustrates a flowchart of an algorithm that the ECU 36 can perform in order to determine a real-time determination of the steering angle signal, $\delta_{AWD}$, referenced in step S102 of FIG. 2. The ECU 36 can begin the steering angle determination algorithm at step S102, and then can proceed to step S112.

At step S112, the ECU 36 can determine whether the ECU 36 has started its calibration of the steering angle sensor 38 so that the neutral position of the steering angle sensor 38 can be determined. Calibration of the sensor 38 can be advantageous after a shut-down of the power source 18, a power interruption to the ECU 36 and/or the steering angle sensor 38, a temporary malfunction of the ECU 36 and/or the steering angle sensor 38, and/or other similar event where prior calibration data can be deleted/lost from a memory device of the control system 34. If the ECU 36 determines at step S112 that the calibration algorithm has not been started, then the ECU 36 can proceed to step S114 where the ECU 36 can start the steering angle calibration algorithm.

The steering angle sensor calibration algorithm of step S114 can take multiple iterations to complete. As a result, the ECU 36 can be configured to operate this algorithm in parallel with the steering angle determination algorithm of FIG. 3. This can permit the ECU 36 to advantageously manipulate the rear clutch assemblies 46L, 46R even though the neutral position of the steering angle sensor 38 is undetermined. The steering angle sensor calibration algorithm represented by step S114 will be described with later reference to FIGS. 4-8.

After the ECU 36 starts the steering angle sensor calibration algorithm at step S114 or after the ECU 36 determines at step S112 that the steering angle sensor calibration algorithm has been started, the ECU 36 can proceed to step S116. As will be explained in further detail below, after each iteration of the steering angle calibration algorithm, the ECU 36 can store a value that can indicate the status (e.g., complete or incomplete) of the steering angle calibration algorithm. At step S116, the ECU 36 can determine whether the steering angle calibration algorithm has been completed by the ECU 36 by retrieving and comparing this value during step S116.

In an alternate embodiment, the steering angle sensor 38 can be configured to perform the steering angle sensor calibration algorithm of step S114 (instead of the ECU 36). In this alternate arrangement, the steering angle sensor 38 can signal to the ECU 36 the start and status (e.g., complete or incomplete) of the steering angle algorithm.

If the ECU 36 determines at step S116 that the steering angle sensor calibration algorithm is complete, then the ECU 36 can proceed to step S118. At step S118, the ECU 36 can employ data from the steering angle sensor calibration algorithm and real-time data from the steering angle sensor 38 to determine the steering angle signal, $\delta_{AWD}$, in real-time.

An example of the calculation useful for the determination of the steering angle signal, $\delta_{AWD}$, can be made according to the equation:

$$\delta_{AWD} = \delta_{sensor} - \delta_{neutral}$$

where:

$\delta_{sensor}$ is the real-time data from the steering angle sensor 38; and $\delta_{neutral}$ is the value of the neutral position of the steering angle sensor 38 obtained from the steering angle sensor calibration algorithm initiated at step S114.

If the ECU 36 determines at step S116 that the steering angle sensor calibration algorithm is not yet complete, then the ECU 36 can proceed to step S120. At step S120, the ECU 36 can follow an algorithm that permits the ECU 36 to estimate the steering angle signal, $\delta_{AWD}$, based on data received by the ECU 36 from vehicle sensors other than the steering angle sensor 38. This estimate of the steering angle signal, $\delta_{AWD}$, can provide an approximation of the real-time toe angle of the front wheels 14L, 14R. Thus, the ECU 36 can employ the steering angle signal, $\delta_{AWD}$, with improved accuracy as compared to a pre-defined constant value. Details of this algorithm will be described below with reference to FIGS. 8 and 9.

After completion of either step S118 or step S120, the ECU 36 can move to step S122. Here, the ECU 36 can return to the AWD control algorithm at step S102 and continue through the algorithm beginning at step S104, as described above, to modulate the rear clutch assemblies 46L, 46R based on the steering angle signal, $\delta_{AWD}$, determined at step S118 or at step S120.

Figure 4:
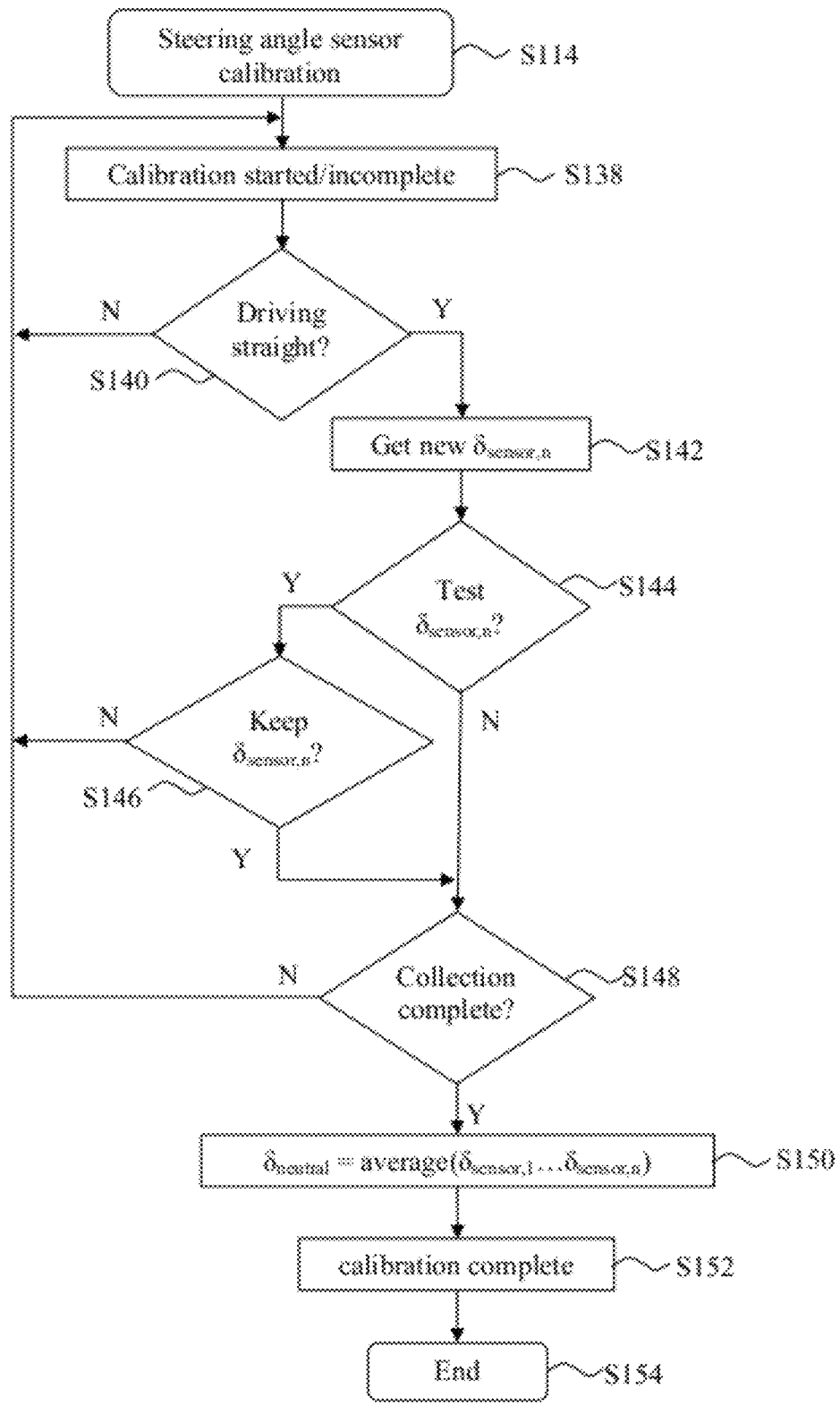
FIG. 4 is a flowchart depicting an exemplary algorithm usable as a subroutine of the algorithm of FIG. 3.

When the control system 34 employs a relative position steering angle sensor 38, the ECU 36 can enhance its determination of an appropriate steering angle signal, $\delta_{AWD}$, by determining how far and in which direction from its neutral position the operator has moved the steering wheel (not shown). As, mentioned above, the steering angle calibration algorithm of step S114 can permit the ECU 36 to make this determination. FIG. 4 illustrates an exemplary embodiment of the steering angle sensor calibration algorithm.

Generally, the vehicle 12 will travel along a substantially straight path when the operator positions the steering wheel in its neutral position. This relationship between steering wheel neutral position and a substantially straight path of travel by the vehicle 12 can form a basis for this exemplary steering angle sensor calibration algorithm. That is, the ECU 36 can determine that data acquired from the relative position steering angle sensor 38 when the vehicle 12 follows a substantially straight path represents a neutral position value, $\delta_{neutral}$.

The steering angle sensor calibration algorithm can permit the ECU 36 to determine the neutral position value, $\delta_{neutral}$, from data provided by sensors other than the steering angle sensor 38, such as but not limited to, the yaw rate sensor 40, the wheel speed sensors 42L, 42R, 43L, 43R, the output shaft speed sensor 44, the lateral acceleration sensor 45, a longitudinal acceleration sensor (not illustrated), and a rotational acceleration sensor (not illustrated).

The steering angle sensor calibration algorithm can begin at step S114. Then the ECU 36 can proceed to step S138. At step S138, the ECU 36 can store internally or externally data indicative of the status (e.g., started, complete, incomplete) of the steering angle sensor calibration algorithm. This data can be later retrieved by the ECU 36 at steps S112 and S116 of the steering angle determination algorithm described above.

The ECU 36 can proceed to step S140 where the ECU 36 can make a judgment regarding the travel path of the vehicle 12 using data from various sensors in electrical communication with the ECU 36. In particular, step S140 can permit the ECU 36 to estimate when the vehicle 12 is traveling along a substantially straight path. While the vehicle 12 travels along a substantially straight path, then the ECU 36 can determine that a particular steering sensor data value, $\delta_{sensor,n}$, can correspond to a neutral position value, $\delta_{neutral}$, for the steering angle sensor 38. Exemplary details of this judgment will be described with reference to FIGS. 5-8.

The ECU 36 can follow two separate and independent algorithms in order to determine when the vehicle 12 follows a substantially straight path of travel. Each of these algorithms can permit the ECU 36 to estimate when a substantially straight travel path occurs independent of the other algorithm. The first of these two independent algorithms (first straight judgment) can rely on data obtained by the wheel speed sensors 42L, 42R, 43L, 43R, the yaw rate sensor 40, and the lateral acceleration sensor 45 along with laboratory data compiled into look-up tables. The second of these two independent algorithms (second straight judgment) can rely on data obtained from the rear wheel speed sensors 42L, 42R, the yaw rate sensor 40, and optionally the output shaft speed sensor 44. The ECU 36 can execute these two straight judgment algorithms in any order or simultaneously. Also, the ECU 36 can forgo execution of one of these two straight judgment algorithms if the ECU 36 estimates from the other straight judgment algorithm that the vehicle is traveling along a substantially straight path.

Using two separate and independent algorithms, the ECU 36 can process a respective unique grouping of data provided by these alternate sensors. These two independent algorithms can complement each other when: (a) the wheel speed is stable and not accelerating; (b) the yaw rate and lateral acceleration data fall within respective straight driving ranges; (c) the determined neutral position value, $\delta_{neutral}$, is within a predetermined tolerance of a zero degree position for the steering wheel; and (d) the steering angle sensor data, $\delta_{sensor}$, is stable over a predetermined period of time (i.e., the steering angle sensor data, $\delta_{sensor}$, indicates little or no movement of the steering wheel during the predetermined period of time). Thus, these two independent assessments of a substantially straight path of travel by the vehicle 12 can improve the speed and reliability for the calibration of the steering angle sensor 38.

FIG. 5 lists a plurality of exemplary data comparisons that can be utilized by the ECU 36 when following each of these separate and independent judgment algorithms. This listing of comparisons can be amended by addition, replacement and/or deletion in order to meet the intended performance specifications for the system. The first straight judgment algorithm can rely on data from the rear wheel speed sensors 42L, 42R, the front wheel speed sensors 43L, 43R, the yaw rate sensor 40, and the lateral acceleration sensor 45. The second straight judgment can rely on data from the rear wheel speed sensors 42L, 42R, the yaw rate sensor 40 and the output shaft speed sensor 44. Thus, the ECU 36 can judge a substantially straight path of travel by the vehicle 12 based on two independent data sets.

The first straight judgment algorithm can evaluate five parameters: 1) wheel slip; 2) cruise status (e.g., substantially no acceleration); 3) estimated straight travel as a function of yaw rate; 4) estimated straight travel as a function of lateral acceleration; and 5) minimum speed to achieve precision for estimated straight travel. The analysis of these parameters can be performed in any order and the threshold values relied upon for comparison of these parameters can be set in accordance with the desired performance specifications for the vehicle 12. In another embodiment, any one or any combination of these parameters can be omitted or can be replaced with any other parameter(s) appropriate to achieve the desired performance specifications for the vehicle 12. In another embodiment, parameters in addition to those described can be considered in order to achieve the desired performance specifications for the vehicle 12.

In the first data comparison of the first straight judgment outlined in FIG. 5, a plurality of wheel slip ratios can be analyzed by the ECU 36 in accordance with step S140 of FIG. 4. Each wheel slip ratio analyzed can indicate the percent difference between speeds of different pairs of the wheels 14L, 14R, 16L, 16R. When the vehicle 12 travels along a straight path, each of the wheels 14L, 14R, 16L, 16R can rotate at substantially the same speed. Thus, a slip ratio substantially equal to zero can be indicative of a substantially straight travel path by the vehicle 12.

A slip threshold value that corresponds to a substantially straight path can be predetermined according to the desired precision and accuracy for the straight travel estimation and the dynamic performance desired for the vehicle 12. In an exemplary embodiment, the slip threshold can be set at 4%. Thus, if the ECU 36 determines at step S140 that the slip ratios described above are each less than the slip threshold, then the ECU 36 can determine that one possible parameter of straight travel is met.

During step S140 of FIG. 4, the ECU 36 can use real-time data from the wheel speed sensors 42L, 42R, 43L, 43R to determine the slip ratio between: a) the front wheels 14L 14R; b) the rear wheels 16L, 16R; and c) the average of the two front wheel speeds and the average rear wheel speeds. The ECU 36 can compare each of these slip ratios to the slip threshold. The value of the slip threshold can be identical or unique for each of the determined slip ratios, as required to obtain the desired performance specification of the vehicle 12.

In an alternate embodiment, the slip ratio of one or more pairs of diagonal wheels can be analyzed by the ECU 36 during step S140. This diagonal ratio comparison can be in addition to or in place of any one or combination of the slip ratio comparisons described above.

In the second data comparison of the first straight judgment, the ECU 36 can compare an acceleration value to an acceleration threshold value. The acceleration threshold value can represent a cruising condition for the vehicle 12 where the acceleration of the vehicle 12 is substantially zero. Thus, this comparison can indicate that the wheel speed sensors 42L, 42R, 43L, 43R are providing stable wheel speed data. The acceleration threshold value can be any appropriate predetermined value that can provide the desired precision and accuracy for the straight travel estimate and the dynamic performance desired for the vehicle 12. An exemplary acceleration threshold value can be 0.3 g, where g represents the acceleration value of gravity.

The acceleration value can indicate the acceleration of the front axle, the rear axle, or the propeller shaft 28. The axle acceleration value can be derived from any combination of the wheel speed sensors 42L, 42R, 43L, 43R. In an alternate embodiment, the axle acceleration value can be provided to the ECU 36 by an accelerometer (not illustrated)—or other appropriate sensor known in the art—associated with an appropriate component of the drivetrain, such as but not limited to the front differential assembly 22 or any of the shafts 24L, 24R, 28, 32L, 32R, in any manner known in the art. In another alternate embodiment, the ECU 36 can acquire the acceleration value from a longitudinal acceleration sensor (not shown) mounted on an appropriate portion of the vehicle 12 in any manner known in the art. In the exemplary listing of FIG. 5, the front axle acceleration can be used for this comparison where the ECU 36 can be configured to derive the front axle acceleration value from data acquired from one or both of the front wheel speed sensors 43L, 43R.

In the third data comparison of the first straight judgment of FIG. 5, the ECU 36 can compare a lateral acceleration value to a lateral threshold. The lateral acceleration sensor 45 can provide the ECU 36 with either raw data or processed data, which the ECU 36 can utilize for comparison to the lateral threshold. The lateral threshold can be a predetermined value that can indicate substantially straight travel in accordance with the desired precision and accuracy for the straight travel estimate and the dynamic performance desired for the vehicle 12. If the lateral acceleration sensor data is less than the lateral threshold, then ECU 36 can determine at step S140 of FIG. 4 that at least one parameter indicates that the vehicle 12 is probably traveling along a substantially straight path.

The lateral threshold can be a constant predetermined value or it can be a variable predetermined value. Generally, lateral acceleration varies as a function of vehicle speed. Thus, using a lateral threshold that can vary as a function of speed can enhance the precision and accuracy of the straight travel estimation during step S140.

FIG. 6 illustrates two plots of lateral acceleration versus wheel speed taken empirically—one with the steering angle, δ, held at approximately 6° and one with the steering angle, δ, held at approximately 25°—for a particular embodiment of the vehicle 12. As shown by FIG. 6, the plot of the lateral acceleration data when the steering angle, δ, is maintained at 6° is unique from the plot of the lateral acceleration data when the steering angle, δ, is maintained at 25°. Thus, the steering angle, δ, can be estimated from speed data in combination with lateral acceleration data.

A threshold value for the steering angle, δ, for implementing the data available from FIG. 6 can be predetermined to correspond to a substantially straight path of travel in accordance with the desired precision and accuracy for the straight travel assessment and the dynamic performance desired for the vehicle 12. In an exemplary embodiment, a steering angle, δ, of less than 6° can correspond to a substantially straight path of travel for the vehicle 12. Thus, the range of lateral acceleration values within the shaded region A of FIG. 6 can be used as lateral threshold values which can be interpreted by the ECU 36 as indicative of a substantially straight path.

The empirical plots of lateral acceleration data can be unique to a particular embodiment of the vehicle 12 due to many variables, such as but not limited to vehicle weight distribution, and suspension and tire characteristics. Thus, the shaded region A can be unique to each particular embodiment of the vehicle 12.

In the fourth data comparison of the first straight judgment, the ECU 36 can compare a yaw rate value to a yaw threshold. The yaw rate sensor 40 can provide the ECU 36 with either raw data or processed data, which the ECU 36 can utilize for comparison to the yaw threshold. The yaw threshold can be a predetermined value that can indicate substantially straight travel in accordance with the desired precision and accuracy for the straight travel assessment and the dynamic performance desired for the vehicle 12. If the yaw rate data is less than the yaw threshold, then ECU 36 can determine at step S140 that at least one parameter indicates that the vehicle 12 can be traveling along a substantially straight path.

The yaw threshold can be a constant predetermined value or it can be a variable predetermined value. Generally, yaw rate varies as a function of vehicle speed. Thus, using a yaw threshold that can vary as a function of speed can enhance the precision and accuracy of the straight travel assessment. FIG. 7 illustrates two plots of yaw rate versus wheel speed taken empirically—one with the steering angle, δ, held at approximately 6° and one with the steering angle, δ, held at approximately 25°—for a particular embodiment of the vehicle 12. As shown by FIG. 7, the plot of the yaw rate data when the steering angle, δ, is maintained at 6° is unique from the plot of the yaw rate data when the steering angle, δ, is maintained at 25°. Thus, the steering angle, δ, can be estimated from speed data in combination with yaw rate data.

A threshold value for the steering angle, δ, for implementing data of FIG. 7 into step S140 can be predetermined to correspond to a substantially straight path of travel in accordance with the desired precision and accuracy for the straight travel assessment and the dynamic performance desired for the vehicle 12. This threshold value can be the same as or different from that used to with respect to the data of FIG. 6. In an exemplary embodiment, a steering angle, δ, of less than 6° can correspond to a substantially straight path of travel for the vehicle 12. Thus, the range of yaw rate values within the shaded region B of FIG. 7 can be used as yaw threshold values which can be interpreted by the ECU 36 as indicative of a substantially straight path.

The empirical plots of yaw rate data can be unique to a particular embodiment of the vehicle 12 due to many variables, such as but not limited to vehicle weight distribution, and suspension and tire characteristics. Thus, the shaded region B can be unique to each particular embodiment of the vehicle 12.

In the fifth data comparison of the first straight judgment of FIG. 5, the ECU 36 can compare a minimum speed value to a speed threshold. Any combination of the wheel speed sensors 42L, 42R, 43L, 43R and the output shaft speed sensor 44—or any other appropriate sensor associated with a component(s) of the vehicle 12, such as but not limited to the front differential assembly 22, the propeller shaft 28, and any combination of the driveshafts 24L, 24R, 32L, 32R—can provide the ECU 36 with either raw data or processed data, which the ECU 36 can utilize for comparison to the speed threshold.

As noted above and illustrated in FIGS. 6 and 7, the shaded regions A and B might not be applicable to certain speeds in order to meet the desired precision and accuracy for the straight travel assessment and the dynamic performance desired for the vehicle 12. As such, the speed threshold can be set at a value above which the lateral threshold and yaw threshold obtained by the ECU 36 based on wheel speed data can meet the desired precision and accuracy for the straight travel assessment and the dynamic performance desired for the vehicle 12.

If the ECU 36 determines during step S140, that all five parameters of the first straight judgment have been met, then the ECU 36 can reliably estimate that the vehicle 12 is travelling along a straight path. Thus, the first straight judgment can permit the ECU 36 to accurately and reliably estimate when the vehicle 12 travels along a substantially straight path independent of data from the steering angle sensor 38.

Due to constraints mentioned above, the first straight judgment may cause the ECU 36 to be relatively slow in making a determination of a substantially straight path of travel for the vehicle 12. The second straight judgment can permit the ECU 36 to determine a substantially straight path travelled by the vehicle 12 relatively quicker. Thus, the second straight judgment can supplement the first straight judgment and can permit the ECU 36 to minimize the time that can elapse for the ECU to estimate when the vehicle 12 is following a straight path of travel.

The second straight judgment algorithm can evaluate five parameters: 1) a first steering angle, $\delta_V$, based on the data from the rear wheel speed sensors 42L, 42R; 2) a second steering angle, $\delta_Y$, based on data received from the yaw rate sensor 40 and the output shaft speed sensor 44; 3) estimation model agreement; 4) wheel slip; and 5) estimation model accuracy. See FIG. 5. The analysis of these parameters can be performed in any order and the threshold values relied upon for comparison of these parameters can be set in accordance with the desired performance specifications for the vehicle 12. In another embodiment, any one or any combination of these parameters can be omitted or can be replaced with any other parameter(s) appropriate to achieve the desired performance specifications for the vehicle 12. In another embodiment, parameters in addition to those described can be considered in order to achieve the desired performance specifications for the vehicle 12.

Figure 8:
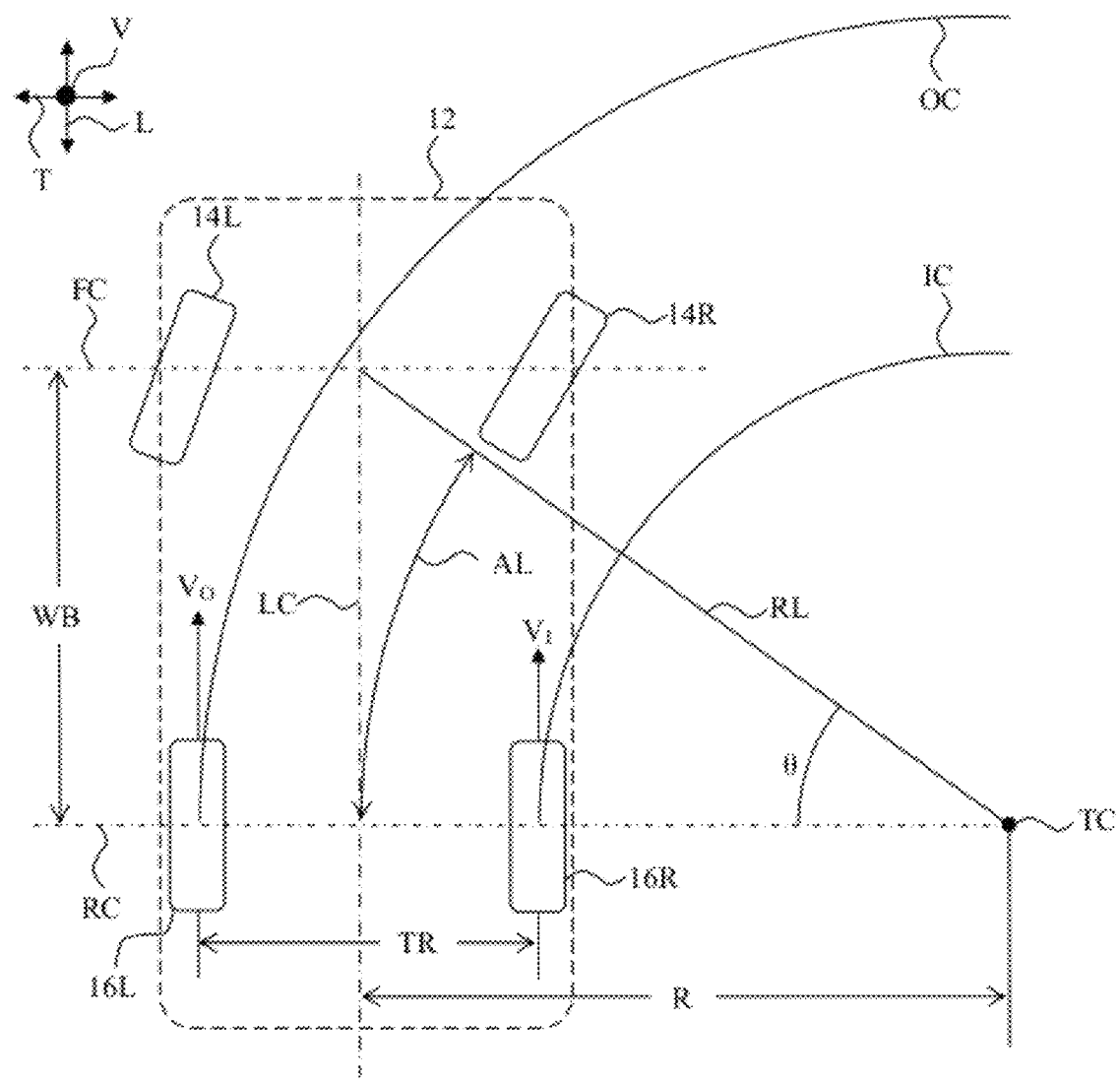
FIG. 8 is a schematic depicting various physical parameters of the vehicle of FIG. 1 traversing a curved path.

In the first data comparison of the second straight judgment at step S140 of FIG. 4, the ECU 36 can compare the first steering angle, $\delta_V$, to an angle threshold. FIG. 8 schematically represents parameters underlying the equations the ECU 36 can use during step S140 to calculate the first steering angle, $\delta_V$, the details of which will be described below. The angle threshold can be a predetermined constant that can be indicative of a substantially straight path in accordance with the desired precision and accuracy for the straight travel assessment and the dynamic performance desired for the vehicle 12. In an exemplary embodiment, the angle threshold can be approximately 5°. If the ECU 36 determines at step S140 that the first steering angle, $\delta_V$, is less than the angle threshold, then the ECU 36 can determine that at least one possible parameter of the second straight judgment indicates a substantially straight path of travel by the vehicle 12.

In the second data comparison of the second straight judgment at step S140 of FIG. 4, the ECU 36 can compare the second steering angle, $\delta_Y$, to an angle threshold. FIG. 8 schematically represents parameters underlying the equations the ECU 36 can use during step S140 to calculate the second steering angle, $\delta_Y$, the details of which will be described below. This angle threshold can be a predetermined constant that can be indicative of a substantially straight path in accordance with the desired precision and accuracy for the straight travel assessment and the dynamic performance desired for the vehicle 12. This angle threshold can have the same value as the angle threshold for the first steering angle, $\delta_V$, or it can have a different value. In an exemplary embodiment, this angle threshold can be approximately 5°. If the ECU 36 determines at step S140 that the second steering angle, $\delta_Y$, is less than the angle threshold, then the ECU 36 can determine that at least one possible parameter of the second straight judgment indicates a substantially straight path of travel by the vehicle 12.

In the third data comparison of the second straight judgment at step S140, the ECU 36 can compare the sum of the first steering angle, $\delta_V$, and the second steering angle, $\delta_Y$, to a sum angle threshold. This sum comparison can increase the accuracy with which the ECU 36 can determine a straight path of travel by the vehicle 12 and can reduce unintentional determination by the ECU 36 that the steering wheel (not shown) is in its neutral position.

For example, it can be possible that one of the first and second steering angles, $\delta_V$, $\delta_Y$, is estimated to meet the threshold requirement described above while the other of the steering angles, $\delta_V$, $\delta_Y$, does not meet the threshold requirement described above. In another example, the operator may move the steering wheel (not shown) away from its neutral position just prior to or just after a turn, or series of turns, and one or both of the first and second steering angles, $\delta_V$, $\delta_Y$, might incorrectly indicate a substantially straight path due to a random sample of data during these dynamic changes in the vehicle's yaw and speed characteristics. Incorporating this sum comparison into step S140 can permit the ECU 36 to avoid such an unintentional determination of a straight path of travel by the vehicle 12.

This sum angle threshold value can be a predetermined constant that can be indicative of a substantially straight path in accordance with the desired precision and accuracy for the straight travel assessment and the dynamic performance desired for the vehicle 12. This sum angle threshold can have the same value as the angle threshold for the first steering angle, $\delta_V$, or the angle threshold for the second steering angle, $\delta_Y$, (especially when the sum is averaged by dividing it by two) or it can have a different value. In an exemplary embodiment, this sum angle threshold can be approximately 5° and the sum that is compared to the threshold can be averaged.

If the ECU 36 determines at step S140 that the sum of the first steering angle, $\delta_V$, and the second steering angle, $\delta_Y$, is less than the angle threshold, then the ECU 36 can determine that at least one possible parameter of the second straight judgment indicates a substantially straight path of travel by the vehicle 12.

In the fourth data comparison of the second straight judgment at step S140 of FIG. 4, the ECU 36 can compare a wheel slip amount to a second slip threshold. When the vehicle 12 travels along a straight path, each of the wheels 14L, 14R, 16L, 16R can rotate at substantially the same speed. Thus, wheel slip that is substantially equal zero can be indicative of a substantially straight travel path by the vehicle 12.

This second slip threshold value can be a predetermined constant that can be indicative of a substantially straight path in accordance with the desired precision and accuracy for the straight travel assessment and the dynamic performance desired for the vehicle 12. This second slip threshold can be the same as or different from the slip threshold discussed above with respect to the first data comparison of the first straight judgment. If the ECU 36 determines at step S140 that the wheel slip amount is less than the second slip threshold, then the ECU 36 can determine that at least one possible parameter of the second straight judgment indicates a substantially straight path of travel by the vehicle 12. In an exemplary embodiment the second slip threshold can be approximately 1 kph.

The ECU 36 can determine this wheel slip amount based on data from an appropriate plurality of the four wheel speed sensors 42L, 42R, 43L, 43R. For example, the wheel slip amount can be a difference between the values acquired from the two front wheel speed sensors 43L, 43R, or the difference between the values acquired from the two rear wheel speed sensors 42L, 42R, or the difference between the average value acquired from the two front wheel speed sensors 43L, 43R and the average value acquired from the two rear wheel speed sensors 42L, 42R, or a difference between the maximum value chosen from the values acquired from the four wheel speed sensors 42L, 42R, 43L, 43R and the minimum value chosen from the values acquired from the four wheel speed sensors 42L, 42R, 43L, 43R, or a difference between diagonally opposed pairs of the wheels 42L, 42R, 43L, 43R. Other appropriate wheel slip evaluations can also be used. In an exemplary embodiment, the ECU 36 can determine the wheel slip amount at step S140 by calculating the difference between the maximum and minimum values acquired from the rear wheel speed sensors 42L, 42R and then comparing this difference to the second slip threshold.

In the fifth data comparison of the second straight judgment at step S140, the ECU 36 can compare an appropriate one or combination of values acquired from the four wheel speed sensors 42L, 42R, 43L, 43R to a minimum threshold value and a maximum threshold value. In an exemplary embodiment depicted in FIG. 5, the data from the two rear wheel speed sensors 42L, 42R can be used for this comparison. These maximum and minimum threshold values can be predetermined constants that can enhance the model accuracy for the determination of the first and second steering angles, $\delta_V$, $\delta_Y$, in accordance with the desired precision and accuracy for the straight travel assessment and the dynamic performance desired for the vehicle 12. In an exemplary embodiment, the minimum threshold value can be 5 kph and the maximum threshold can be 200 kph. Thus, the second straight judgment can be effective at speeds lower than that at which the first straight judgment can be effective such that the ECU 36 can estimate the vehicle 12 can be following a substantially straight path in accordance with the second straight judgment sooner that it can in accordance with the first straight judgment.

The derivation of the first and second steering angles, $\delta_V$, $\delta_Y$, will know be discussed with reference to FIG. 8. FIG. 8 schematically represents the parameters underlying the equations that can be used by the ECU 36 during step S140 to calculate the first and second steering angles, $\delta_V$ and $\delta_Y$ of the second straight judgment. The vehicle 12 can include a longitudinal centerline LC, a front centerline FC and a rear centerline RC. The longitudinal centerline LC extends in the longitudinal direction L down the transverse center of the vehicle 12. The front centerline FC extends in the transverse direction T of the vehicle 12 and through the pivot points (not shown) of the front wheels 14L, 14R. The rear centerline RC extends through the rotational centers of the rear wheels 16L, 16R. The rotational centers of the front wheels 14L, 14R are spaced in the longitudinal direction L from the rotational centers of the rear wheels 16L, 16R by a wheelbase distance, WB. And, the rear wheels 16L, 16R are spaced apart in the transverse direction T by a track width distance, TR measured to the centerlines (relative to the transverse direction T) of the rear wheels 16L, 16R.

FIG. 8 depicts the vehicle 12 traversing a right-hand curve centered about a turning center TC with the front wheels 14L, 14R pivoted to the right. The longitudinal centerline LC is spaced from the turning center TC measured along the rear centerline RC by a radial distance, R. A radial line RL extends from the intersection of the front centerline FC with the longitudinal centerline LC and intersects the rear centerline RC at the turning center TC of the vehicle 12.

An average toe angle, $\theta$, represents an average of the angles at which the two front wheels 14L, 14R are pivoted under this scenario. The average toe angle, $\theta$, of the front wheels 14L, 14R is the angle measured between the radial line RL and rear centerline RC. (The average toe angle, $\theta$, also is the angle between the radial line RL and the front centerline FC.)

An arc of a circle centered about the turning center TC, extending from the radial line RL, and terminating at the intersection of the longitudinal centerline LC with the rear centerline RC has an arc length, AL. It is assumed that the arc length, AL, is substantially equal to the wheelbase distance, WB. From this assumption, the arc length formula provides the following relationship:

$$\theta = \frac{WB}{R} \quad \text{(equation 1)}$$

where the average toe angle, θ, is expressed in radians.

In the scenario depicted by FIG. 8, the left rear wheel 16L travels at an outside wheel speed, $V_O$, and follows an outside circular path OC. The right rear wheel 16R travels at an inside wheel speed, $V_I$, and follows an inside circular path IC, where the inside circular path IC is concentric with the outside circular path OC, has a smaller radius than the outside circular path OC, and the inside circular path IC and the outside circular path OC are centered on the turning center TC. Also, the outside speed, $V_O$, is greater than the inside speed, $V_I$. As a result, the two following equations of motion for the respective rear wheels 16L, 16R can be derived:

$$2\pi \times \left(R + \frac{TR}{2}\right) = V_O \times t \quad \text{(equation 2)}$$

$$2\pi \times \left(R - \frac{TR}{2}\right) = V_I \times t \quad \text{(equation 3)}$$

where t represents the amount of time elapsed while traveling each circular path OC, IC.

These equations of motion (equations 2 and 3) can be combined into a single equation by solving each for the time, t. The resultant equation can be combined with the arc length approximation (equation 1) discussed above after solving each for the radial distance, R. The following equation for the average toe angle, θ, can result:

$$\theta = \frac{V_O - V_I}{V_O + V_I} \times \frac{2 \times WB}{TR} \quad \text{(equation 4)}$$

where the average toe angle, θ, is expressed in radians.

Typical steering systems include a reduction drive (not shown) between the steering wheel and the front wheels 14L, 14R that defines a steering ratio, SR. For example, the steering ratio can be defined by a gear ratio of a rack and pinion assembly (not shown) positioned intermediate the steering column (not shown) and the tie rods (not shown) of the steering system. In such known steering systems, the steering angle sensor 38 can be placed intermediate the steering wheel and the reduction drive. Thus, the first steering angle, $\delta_V$, can be determined according to the following equation:

$$\delta_V = SR \times \theta \times \frac{180}{\pi} \quad \text{(equation 5)}$$

By combining the average toe angle equation (equation 4) and first steering angle equation (equation 5), the first steering angle, $\delta_V$, can be expressed as:

$$\delta_V = \frac{V_O - V_I}{V_O + V_I} \times \frac{360 \times WB \times SR}{\pi \times TR}$$

In this equation, only the values for the inside and outside wheel speeds, $V_I$ and $V_O$, vary over time. The rear wheel speed sensors 42L, 42R can provide real-time speed data to the ECU 36 that represents values for the outside wheel speed, $V_O$, and the inside wheel speed, $V_I$, respectively. Thus, the first steering angle, $\delta_V$, can represent a real-time, wheel velocity-based estimate of the steering angle, δ, using data from the rear wheel speed sensors 42L, 42R. Further, the first steering angle, $\delta_V$, can be independent from the data from the steering angle sensor 38 so that the ECU 36 can rely on the first steering angle, $\delta_V$, when data from the steering angle sensor 38 is unavailable due to incomplete calibration (see, for example, step S116 of FIG. 3) or other inaccuracy or an interruption of data from the steering angle sensor 38.

As mentioned above, the steering angle, δ, also can be approximated using data from the yaw rate sensor 40. The data from the yaw rate sensor 40 can be used by the ECU 36 to calculate the second steering angle, $\delta_Y$. Thus, the second steering angle, $\delta_Y$, also can be independent from the data generated by the steering angle sensor 38, as well as independent of the first steering angle, $\delta_V$.

With continued reference to FIG. 8, the radial distance R defining the circumference of any circular path centered about the turning center TC that the vehicle 12 traverses can be expressed by the following equation:

$$R = \frac{360 \times V_v}{2\pi \times Y} \quad \text{(equation 6)}$$

where:

$V_V$ is the real-time speed of the vehicle 12 expressed in units of distance per time (such as meters per second); and Y is the real-time data from the yaw rate sensor 40 expressed in degrees per second. In an exemplary embodiment according to the disclosed subject matter, the vehicle speed, $V_V$, can be derived from real-time data generated by the transmission output shaft speed sensor 44. However, any source(s) known to be capable of generating real-time data representing the vehicle speed, $V_V$, can be used, such as, but not limited to, use of any combination of the wheel speed sensors 42L, 42R, 43L, 43R as described above, or the engine speed in combination with the gear ratio active in the transmission 20, or data from a longitudinal acceleration sensor, or an optical ground speed sensor, or a Tire Pressure Monitoring System (TPMS)-based speed sensor, or data from a global positioning system (gps). The TPMS sensor typically measures the pressure within the tire, and reports it back to an ECU. It is possible to install an acceleration sensor into the TPMS, which could be used to calculate the tire speed.

Combining this yaw rate-based expression for the radial distance, R, (equation 6) with the arc length formula (equation 1)—after solving the arc length formula (equation 1) for the radial distance, R—can result in the following equation:

$$\theta = \frac{2\pi \times WB \times Y}{360 \times V_V} \quad \text{(equation 7)}$$

where the average toe angle, θ, is expressed in radians.

Like the first steering angle, $\delta_V$, the second steering angle, $\delta_Y$, can be expressed in terms of the average toe angle, θ, and the steering ratio, R, as:

$$\delta_Y = SR \times \theta \times \frac{180}{\pi} \quad \text{(equation 8)}$$

Combining the average toe angle equation (equation 7) and second steering angle equation (equation 8) can result in the following expression for the second steering angle, $\delta_Y$:

$$\delta_Y = \frac{WB \times Y \times SR}{V_V}$$

In this equation, only the values for the yaw rate, Y, and the vehicle speed, $V_V$, vary over time. Real-time data representing the yaw rate, Y, can be generated by the yaw rate sensor 40 and real-time data representing the vehicle speed, $V_v$, can be generated by the transmission output shaft speed sensor 44. Thus, the second steering angle, $\delta_Y$, can represent a real-time, yaw rate-based estimate of the steering angle, $\delta$. Further, the second steering angle, $\delta_Y$, can be independent from the data from the steering angle sensor 38 so that the ECU 36 can rely on the second steering angle, $\delta_Y$, when data from the steering angle sensor 38 is unavailable due to incomplete calibration (see, for example, step S116 of FIG. 3) or other inaccuracy or an interruption of data from the steering angle sensor 38.

If the ECU 36 determines during step S140 of FIG. 4, that all five parameters of the second straight judgment have been met, then the ECU 36 can reliably predict that the vehicle 12 is travelling along a substantially straight path. Thus, the second straight judgment can permit the ECU 36 to accurately and reliably estimate when the vehicle 12 travels along a substantially straight path independent of data from the steering angle sensor 38. Further, the second straight judgment can be used to supplement the first straight judgment in order to minimize the elapsed time to determine a substantially straight path of travel without adversely affecting the reliability of this determination.

The ECU 36 can perform the first and second straight judgments sequentially in any order or the ECU 36 can perform the first and second straight judgments simultaneously. Also, if the ECU 36 need not perform both of the first and second straight judgments. That is, if the ECU 36 determines that one of the straight judgments estimates a substantially straight path of travel by the vehicle 12, then the ECU 36 can forgo execution of the other of the straight judgments.

Returning to the exemplary algorithm depicted by FIG. 4, if, at step S140, the ECU 36 determines that neither the first straight judgment nor the second straight judgment estimates a substantially straight path, then the ECU 36 can return to step S138. If, at step S140, the ECU 36 determines that one or both of the straight judgments estimates a substantially straight path, then the ECU 36 can proceed to step S142.

Generally, when one or both of the first and second straight judgments permit the ECU 36 to estimate a straight path of travel for the vehicle, the ECU 36 can associate the position of the steering wheel, as reflected by the data acquired by the ECU 36 from the steering angle sensor 38, with the neutral position, $\delta_{neutral}$. Subsequent to the substantially straight driving path estimation resultant at step S140, the ECU 36 can acquire data from the steering position sensor 38 at step S142. The ECU 36 can associate this data with the neutral position, $\delta_{neutral}$, for the steering wheel (not shown) and the calibration of the steering angle sensor 38 can be complete.

Then, ECU 36 can return to the steering angle determination algorithm at step S116 where the ECU 36 can determine that the sensor calibration is complete. Then, the ECU 36 can proceed to steps S118 and S122, as described above.

However, under certain conditions, this blind association of the neutral position, $\delta_{neutral}$, and a substantially straight travel path might not permit a level of precision and accuracy that can permit the desired performance for the vehicle 12. As stated above, the first and second straight judgments are merely estimations of a substantially straight path of travel, not an absolute confirmation that the vehicle 12 is following a substantially straight path of travel. Further, neither the first straight driving judgment nor the second straight driving judgment assume, or necessarily require, the steering wheel (not shown) to be precisely in its neutral position when either or both estimate a straight path of travel for the vehicle 12.

Moreover, under certain conditions the vehicle 12 can follow a substantially straight path but the steering wheel (not shown) can be rotated from its neutral position. For example, the vehicle 12 could be sliding along a substantially straight path but the operator has rotated the steering wheel all the way to its counter-clockwise lock position. In another example, the vehicle 12 may lag in its response to the operator's steering input such that the vehicle 12 continues along a straight path for a minute period of time despite the operator rotating the steering wheel to a position precisely different from the neutral position. In another example, a driver may rotate the steering wheel quickly from left to right in rapid succession, and the dynamic changes in the vehicle's drive characteristics at that time may indicate straight travel while the actual steering wheel angle is not indicative of straight travel. In yet another example, the interaction between the suspension geometry for the vehicle 12 and the camber of the road can result in the vehicle 12 travelling along a substantially straight path despite the operator holding the steering wheel at a position rotated from the precise neutral position. Thus, if the ECU 36 merely associates the steering sensor value, $\delta_{sensor}$, acquired immediately upon a result of "Yes" at step S140, then the calibration of the steering angle sensor 38 by the ECU 36 might not have a degree of precision and/or accuracy on level with the dynamic performance desired for the vehicle 12.

In order to account for these and other potential discrepancies, the steering angle calibration algorithm can be an iterative process that can permit the ECU 36 to collect a plurality of steering sensor values, $\delta_{sensor,n}$, over a predetermined sample period and then process this plurality of steering sensor values, $\delta_{sensor,n}$, in any appropriate manner to derive a value for the neutral position, $\delta_{neutral}$ for the steering angle sensor 38 Further discussion of this derivation will occur below.

In this exemplary embodiment where the steering angle calibration algorithm is an iterative process, the ECU 36 can initiate (and increment as appropriate) a timer (or counter) for this predetermined sample period at step S138. With each iteration of step S142, the ECU 36 can acquire a collection of a plurality of steering sensor values, $\delta_{sensor,n}$. The ECU 36 can store internally or externally in any manner known in the art each value of the new real-time steering angle sensor data $\delta_{sensor,n}$ for later retrieval and/or processing in any appropriate manner known in the art. From step S142, the ECU 36 can proceed to step S144 of FIG. 4.

As mentioned above, it can be possible for the operator to alter the position of the steering wheel (not shown) from its neutral position despite the vehicle 12 maintaining a substantially straight path of travel. At step S144, the ECU 36 can determine if a sufficient sample size (or sufficient elapsed time) has been reached that can provide a meaningful evaluation of whether the operator is currently altering the position of the steering wheel. The sample size or elapsed time can be a predetermined value according to the desired precision and accuracy for the determination of the neutral position, $\delta_{neutral}$, and the dynamic performance desired for the vehicle 12. In an exemplary embodiment, the ECU 36 can acquire data from the steering angle sensor 38 every 10 ms and can amass a collection of steering angle values, $\delta_{sensor\,n}$, totaling 100.

If the ECU 36 determines at step S144 that a requisite sample size (or elapsed time) has occurred, then the ECU 36 can proceed to step S146 of FIG. 4. At step S146, the ECU 36 can compare the current steering angle value, $\delta_{sensor,n}$, to one or more previously sampled values to determine whether any variation between the stored steering angle values, $\delta_{sensor,n}$, is within or outside a predetermined displacement threshold. This displacement threshold can be a predetermined value according to the desired precision and accuracy for the determination of the neutral position, $\delta_{neutral}$, and the dynamic performance desired for the vehicle 12. In an exemplary embodiment, this displacement threshold can be 1 degree and the previous steering sensor value can be the steering sensor value collected 500 ms previous to the current sensor value, $\delta_{sensor,n}$. If the ECU 36 determines that the difference between the current steering sensor value, $\delta_{sensor,n}$, and any one or plurality of previous steering angle value(s) (for example, $\delta_{sensor,n-50}$), then the ECU 36 can omit the current steering sensor value, $\delta_{sensor,n}$, from the plurality collected.

If the ECU 36 determines at step S146 that the current steering sensor value, $\delta_{sensor,n}$, is not acceptable for collection, then the ECU 36 can return to step S138 and can begin another iteration of the steering angle sensor calibration algorithm.

If the ECU 36 determines at step S144 that the requisite sample size (or elapsed time) has not occurred or determines at step S146 that the sampled current steering sensor value, $\delta_{sensor,n}$, is acceptable for collection, then the ECU 36 can proceed to step S148 of FIG. 4. At step S148, the ECU can determine whether a requisite plurality of steering sensor values, $\delta_{sensor,n}$, has been collected. The requisite number of steering sensor values, $\delta_{sensor,n}$, can be set at a predetermined value according to the desired precision and accuracy for the determination of the neutral position, $\delta_{neutral}$, and the dynamic performance desired for the vehicle 12. In an exemplary embodiment the sample size can be set at 100.

If the ECU 36 determines at step S148 that the requisite plurality has not been met, then the ECU 36 can return to step S138 and begin another iteration of the steering angle sensor calibration algorithm. If the ECU 36 determines at step S148 that the requisite plurality has been met, then the ECU 36 can proceed to step S150 of FIG. 4.

At step S150, the ECU 36 can perform any appropriate analysis known in the art of the collected plurality of steering sensor values, $\delta_{sensor,n}$, that can permit the ECU 36 to derive a value for the neutral position, $\delta_{neutral}$, consistent with the dynamic performance desired for the vehicle 12. For example, the ECU 36 can perform a simple averaging operation on the collected data. In another example, the ECU 36 can perform an intricate statistical analysis of the collected data. Alternatively a mean value could be used by the ECU 36.

Upon completion of the analysis performed at step S150, the ECU 36 can proceed to step S152 of FIG. 4. At step S152, the ECU 36 can store a value, internally or externally in any manner known in the art, for later retrieval at step S116, as described above with respect to the steering angle determination algorithm depicted by FIG. 3.

Then, the ECU 36 can proceed to step S154 of FIG. 4 where the ECU 36 can exit the steering angle sensor calibration algorithm and return to the steering angle determination algorithm depicted by FIG. 3 intermediate steps S114 and S116.

Thus, in the exemplary embodiment of FIG. 1, the ECU 36 can be provided with software that can permit the ECU 36 to determine the neutral position for the relative position steering angle sensor 38 in a manner that can be efficient, precise and accurate. This system for calibration of the relative position steering angle sensor 38 can be simple in design and minimize cost because complex circuitry and/or additional hardware can be avoided and the cost and/or complexity advantage(s) of a relative position sensor can be maintained.

Further, the ECU 36 can be configured with software that can implement two independent judgments for estimating when the vehicle 12 might be following a straight travel path. One of these judgments can have a relatively high degree of precision and accuracy at the sacrifice of elapsed time. The other of the judgments can conclude in less time with only a minor impact to accuracy and/or precision. Thus, using these two judgments sequentially in any order or simultaneously can minimize the time elapsed for the ECU 36 to complete a precise and accurate calibration of the relative position steering angle sensor 38.

Still further, other operator assistance systems known in the art, such as, but not limited to, an electric power steering system (EPS), a four-wheel steering system (4ws), and a braked-based vehicle stability assistance system (aka, VSA, VSC, or ESP), can rely on steering sensor data. Many of these assistance systems do not require determination of the neutral position. As such, raw data from the relative position steering angle sensor 38 can be sufficient for these operator assistance systems and can be shared by each of these operator assistance systems along with the exemplary all-wheel drive control system 36 of the presently disclosed subject matter, thereby further reducing overall cost and complexity for the vehicle 12.

As noted above, the steering angle determination algorithm of FIG. 3 can include a steering angle estimation algorithm at step S120. The steering angle estimation algorithm can permit the ECU 36 to approximate a real-time value of the toe angle of the front wheels 14L, 14R from data provided by sensors other than the steering angle sensor 38. In particular, the steering angle estimation algorithm can permit the ECU 36 to approximate the first steering angle, $\delta_V$, based on the data from the wheel speed sensors 42L, 42R. Also, the steering angle determination algorithm can permit the ECU 36 to approximate the second steering angle, $\delta_Y$, based on data received from the yaw rate sensor 40. The algorithm can include further steps that enable the ECU 36 to select from the first and second steering angles, $\delta_V$ and $\delta_Y$, to determine the best approximation of the real-time toe angle of the front wheels 14L, 14R. The steering angle estimation algorithm can use the same equations discussed above to approximate the first steering angle, $\delta_V$, and the second steering angle, $\delta_Y$. The above discussion of FIG. 8 for the parameters underlying the equations used by the steering angle estimation algorithm to calculate the first and second steering angles, $\delta_V$ and $\delta_Y$.

Figure 9:
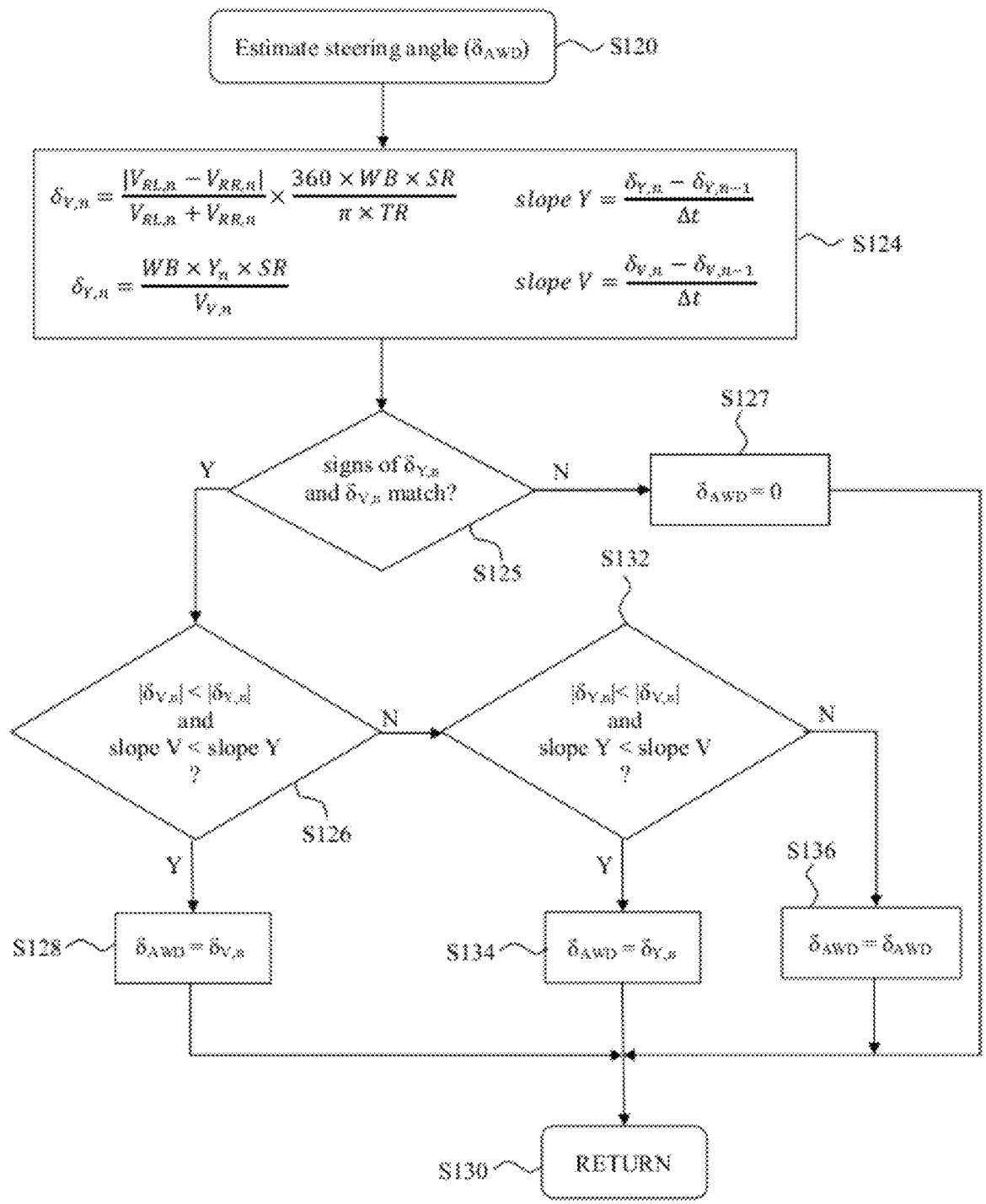
FIG. 9 is a flowchart depicting an exemplary algorithm usable as a subroutine of the algorithm of FIG. 3, which algorithm can be executed in parallel to that depicted in FIG. 4.

FIG. 9 depicts a flowchart representing the steering angle estimation algorithm of step S120 that utilizes the first and second steering angles, $\delta_V$ and $\delta_Y$. Upon beginning the steering angle estimation algorithm at step S120, the ECU 36 can move to step S124. During step S124, the ECU 36 can determine values for each of the first steering angle, $\delta_V$, and the second steering angle, $\delta_Y$, in accordance with the above equations and using the real-time data received from the yaw rate sensor 40, the wheel speed sensors 42L, 42R, and the transmission output shaft sensor 44. The ECU 36 can be configured to store each value calculated for the first and second steering angles, $\delta_V$ and $\delta_Y$, after every iteration of the steering angle estimation algorithm. Any storage device known in the art can be used for this purpose.

Because the ECU 36 can recall previous values calculated for the first and second steering angles, $\delta_V$ and $\delta_Y$, the steering angle estimation algorithm can permit the ECU 36 to calculate the rate of change of the first and second steering angles, $\delta_V$ and $\delta_Y$, with respect to time. In particular, the first rate of change, slope V, of the first steering angle, $\delta_V$, and the second rate of change, slope Y, of the second steering angle, $\delta_Y$, can be calculated according to the following equations:

$$\text{slope } V = \frac{\delta_{V,n} - \delta_{V,n-1}}{\Delta t}$$

$$\text{slope } Y = \frac{\delta_{Y,n} - \delta_{Y,n-1}}{\Delta t}$$

Then, the ECU 36 can proceed to step S126 to begin the process of selecting the most advantageous estimate for the steering angle signal, $\delta_{AWD}$, from either a predetermined constant value, the first steering angle, $\delta_V$, the second steering angle, $\delta_Y$, or a previously selected one of the first steering angle, $\delta_V$, and the second steering angle, $\delta_Y$. In the exemplary embodiment of FIG. 5, the ECU 36 can be configured to select the predetermined constant value if a comparison of the first steering angle, $\delta_V$, with the second steering angle, $\delta_Y$, suggests a fault error in the system 34 or suggests an erratic driving input from the operator of the vehicle 12. Also in this exemplary embodiment, a minimum function comparison of the values of the current and previous first steering angle, $\delta_{V,n}$ and $\delta_{V,n-1}$, with the values of the current and previous second steering angles, $\delta_{Y,n}$ and $\delta_{Y,n-1}$, can be used.

At step S125, the ECU 36 can compare the signs (i.e., positive or negative) of the first steering angle, $\delta_V$, and the second steering angle, $\delta_Y$. If these steering angles, $\delta_V$, $\delta_Y$, are either both positive or both negative, then generally it can be assumed that the calculations of the steering angles, $\delta_V$, $\delta_Y$, are reliable and the operator is not providing large and/or erratic changes in directional input to the steering system. However, if one of the first steering angle, $\delta_V$, and the second steering angle, $\delta_Y$, is negative and the other is positive, then it can either be assumed that there is a fault or that the driver is quickly changing the steering input between a left turning input and a right turning input. Under this condition of the steering angles, $\delta_V$, $\delta_Y$, the ECU 36 can be configured to select a constant value that can have a minimum impact on the stability of the vehicle 12. Thus, this comparison can account for a fault in the calculation of either the first steering angle, $\delta_V$, or the second steering angle, $\delta_Y$, as well as for any erratic input to the steering system by the operator of the vehicle 12.

In particular, at step S125, the ECU 36 can compare the sign of the first steering angle, $\delta_V$, to the sign of the second steering angle, $\delta_Y$. If the signs do not match (i.e., one is positive and one is negative), then the ECU 36 can proceed to step S127. However, if the ECU 36 determines that both signs are positive or that both signs are negative, then the ECU 36 can proceed to step S126 where the ECU 36 can select the appropriate one of the first steering angle, $\delta_V$, and the second steering angle, $\delta_Y$, to estimate the steering angle signal, $\delta_{AWD}$.

At step S127, the ECU 36 can select the constant predetermined value to estimate the steering angle signal, $\delta_{AWD}$. This predetermined value can have any appropriate value. In this exemplary embodiment, this predetermined value can be zero. A value of zero can correspond to the condition of the vehicle 12 where it is traveling along a straight path. Thus, estimating the steering angle signal, $\delta_{AWD}$, to be zero can minimize any impact on the stability of the vehicle 12 when it is subject to large and/or erratic changes in directional input from the operator or when the calculation of the steering angles, $\delta_V$, $\delta_Y$, might be unreliable. Then, the ECU 36 can proceed to step S130 where the ECU 36 can return to step S102 of the AWD control algorithm (FIG. 2) via step S122 of the steering angle determination algorithm (FIG. 3).

At step S126, the ECU 36 can determine if the current first steering angle, $\delta_{V,n}$, should be selected for use at steps S104 and S106 of the AWD control algorithm (FIG. 2) as the steering angle signal, $\delta_{AWD}$. If the magnitude of the current first steering angle value, $\delta_{V,n}$, and the value of the first rate of change, slope V, calculated at step S124 are less than the magnitude of the current second steering angle value, $\delta_{Y,n}$ and the current value of the second rate, slope Y, respectively, then the ECU can move to step S128.

At step S128, the ECU 36 can assign the steering angle signal, $\delta_{AWD}$, with the current first steering angle, $\delta_{V,n}$. Then the ECU 36 can proceed to step S130 where the ECU 36 can return to step S102 of the AWD control algorithm (FIG. 2) via step S122 of the steering angle determination algorithm (FIG. 3).

If either of these conditions is not met, the ECU 36 can discard the current first steering angle value, $\delta_{V,n}$, for the steering angle signal, $\delta_{AWD}$. As such, the ECU 36 can move to step S132. Here, the ECU 36 can determine if the current second steering angle, $\delta_{Y,n}$, should be selected for use at steps S104 and S106 of the AWD control algorithm (FIG. 2) as the steering angle signal, $\delta_{AWD}$. If the magnitude of the current second steering angle, $\delta_{Y,n}$, and the value of the second rate of change, slope Y, calculated at step S124 are less than the magnitude of the current first steering angle, $\delta_{V,n}$, and the current value of the first rate of change, slope V, respectively, then the ECU can move to step S134.

At step S134, the ECU 36 can assign steering angle signal, $\delta_{AWD}$, with the current second steering angle, $\delta_{Y,n}$. Then the ECU 36 can proceed to step S130 where the ECU 36 can return to step S102 of the AWD control algorithm (FIG. 2) via step S122 of the steering angle determination algorithm (FIG. 3).

If the ECU 36 determines at steps S126 and S132, that the current first and second steering angles, $\delta_{V,n}$, $\delta_{Y,n}$, do not satisfy the above-referenced conditions, then the ECU 36 can proceed to step S136. That is, the ECU can proceed to step S136 if the first steering angle is greater than or equal to the second steering angle when the first rate of change is less than the second rate of change. And, the ECU 36 can proceed to step S136 if the first steering angle is less than the second steering angle when the first rate of change is greater than or equal to the second rate.

At step S136, the ECU 36 can use the previous determined steering angle signal, $\delta_{AWD}$, as the current the steering angle signal, $\delta_{AWD}$, where the previously determined steering angle signal, $\delta_{AWD}$, is determined from the last complete iteration of the steering angle estimation algorithm. Then, the ECU 36 can proceed to step S130 where the ECU 36 returns to step S102 of the AWD control algorithm (FIG. 2) via step S122 of the steering angle determination algorithm (FIG. 3).

However, it is possible to select the current first steering angle, $\delta_{V,n}$, or the current second steering angle, $\delta_{Y,n}$, based on only one comparison condition. For example, the determination of the value for the steering angle can be based on the lesser value of the current first steering angle value, $\delta_{V,n}$, and the current second steering angle value, $\delta_{Y,n}$. In another alternate embodiment other condition(s) can be used in addition to, or in place of any or all of, the conditions specified above.

Thus, the control system 34 can modulate the rear clutch assemblies 46L, 46R in concert with the real-time toe angle of the front wheels 14L, 14R regardless of status (calibrated, interrupted, etc.) of the data from steering angle sensor 38. And, this feature also can be beneficial when there is an error with or a failure of the steering angle sensor 38, regardless of whether the steering angle sensor 38 is a relative position sensor or an absolute position sensor.

The ECU 36 referred to herein can be configured with hardware alone, or to run software, that permits the ECU to send, receive, process and store data and to electrically communicate with sensors, manual switches, actuators and/or other ECUs via electrical communication lines (not numbered—shown as dotted lines in FIG. 1). These lines can be in the form of wires or can be in the form of wireless communication signals. Electrical communication can be either one-way communication or two-way communication and can be networked or not networked in any manner known in the art.

The sensors 38, 40, 42L, 42R, 43L, 43R, 44 can be configured with hardware, with or without software, to perform the assigned task(s). Each of the sensors 38, 40, 42L, 42R, 43L, 43R, 44 can be configured as a smart sensor such that the sensor 38, 40, 42L, 42R, 43L, 43R, 44 can process the raw data collected by the sensor 38, 40, 42L, 42R, 43L, 43R, 44 prior to transmission to the ECU 36 or the sensor 38, 40, 42L, 42R, 43L, 43R, 44 can be configured as a simple sensor that passes the raw data directly to the ECU 36 without any manipulation of the raw data. The sensor 38, 40, 42L, 42R, 43L, 43R, 44 can be configured to send data to the ECU 36, with or without a prompt from the ECU 36.

The power source 18 can be an internal combustion engine, an electric motor or a hybrid of the two, all of which are known in the art. The transmission 20 can be an automatic transmission, a manual transmission, or a semi-automatic transmission, and can include a plurality of stepped gear ratios or can have continuously variable gear ratios, all of which are known in the art. The front differential assembly 22 can have any known configuration, including, but not limited to, an open-type differential or a limited-slip-type differential. The clutch assemblies 46L, 46R can be configured in any manner known in the art, such as, but not limited to, electromagnetic actuated clutch plates or hydraulically actuated clutch plates. The rear differential assembly 30 can include a planetary gear assembly. However, this planetary gear assembly can be omitted depending on the desired application for the vehicle. Exemplary rear differential assemblies and their operation are disclosed in U.S. Patent Application Publication No. 2007/0260388 and co-pending U.S. patent application Ser. No. 12/847,880, entitled, "Control System and Method for Automatic Control of Selection of On-Demand All-Wheel Drive Assembly for A Vehicle Drivetrain", referenced above.

While certain embodiments of the disclosed subject matter are described above, it should be understood that the disclosed subject matter can be embodied and configured in many different ways without departing from the spirit and scope of the invention. For example, the estimated steering angle algorithm can be used with any one of, or any combination of the operator assistance systems described above. Further, the estimated steering angle algorithm can be used with active vehicle control systems, such as, but not limited to, intelligent transportation systems (ITS), where the ECU can control the vehicle 12 without input from the operator, or alternatively, where the ECU can override the operator's input.

In an alternate embodiment, if the performance of an absolute position steering angle sensor is less than optimal or ceases, then the controller 36 can use the estimated steering angle algorithm to maintain on a temporary basis the torque vectoring feature of the control system 36. The estimated steering angle algorithm described above can be provided as a general backup to an absolute position steering angle sensor.

Additionally, other mathematical analysis function(s) can be used to select either the first steering angle, $\delta_V$, the second steering angle, $\delta_Y$, or a previously selected one of the first steering angle, $\delta_V$, and the second steering angle, $\delta_Y$. In another alternate embodiment, any fixed value can be assigned to the steering angle signal, $\delta_{AWD}$, when neither the first steering angle, $\delta_V$, nor the second steering angle, $\delta_Y$, is desirable.

While the subject matter has been described in detail with reference to exemplary embodiments thereof, it will be apparent to one skilled in the art that various changes can be made, and equivalents employed, without departing from the scope of the invention. All related art references discussed above are hereby incorporated by reference in their entirety.

What is claimed is:

1. A system for determining an angular position of a steerable wheel of a vehicle having a plurality of wheels comprising:
    a relative position steering angle sensor configured to output data indicative of a change in position of the steerable wheel;
    a yaw rate sensor configured to output data indicative of an angular velocity of the vehicle about a vertical axis of the vehicle;
    a lateral acceleration sensor configured to output data indicative of an acceleration of the vehicle in a substantially transverse direction of the vehicle;
    a plurality of wheel speed sensors, wherein each wheel speed sensor is configured to output data indicative of a rotational velocity of a respective one of the plurality of wheels; and
    a controller in electrical communication with each of the plurality of wheel speed sensors, the lateral acceleration sensor, and the yaw rate sensor, and the controller is configured to
        determine a minimum wheel speed by comparing the data from each of the plurality of wheel speed sensors,
        compare a first data set and a second data set to respective straight path conditions, wherein the first data set includes data from the yaw rate sensor, data from the lateral acceleration sensor, and the minimum wheel speed, and the second data set includes data from the plurality of wheel speed sensors,
        determine a substantially straight path of travel condition when the comparison of at least one of the first data set and the second data set satisfies the respective straight path conditions, and
        associate data acquired from the steering angle sensor with a neutral position when the controller determines the substantially straight path of travel condition.

2. The system for determining an angular position of a steerable wheel of a vehicle according to claim 1, wherein:
    the first data set further includes:
        at least one slip ratio derived from the data from the plurality of wheel speed sensors; and
        longitudinal acceleration data; and
    the respective straight path conditions include a slip threshold, an acceleration threshold, a lateral threshold, a yaw threshold, and a speed threshold.

3. The system for determining an angular position of a steerable wheel of a vehicle according to claim 2, wherein the controller is configured to compare the first data set by comparing:
the at least one slip ratio to the slip threshold;
the acceleration data to the acceleration threshold;
the data from the lateral acceleration sensor to the lateral threshold;
the data from the yaw rate sensor to the yaw threshold; and
the minimum wheel speed to the speed threshold.

4. The system for determining an angular position of a steerable wheel of a vehicle according to claim 3, wherein the controller is configured to determine a substantially straight path of travel condition when:
the at least one slip ratio is less than the slip threshold;
the acceleration data is less than the acceleration threshold;
the data from the lateral acceleration sensor is less than the lateral threshold;
the data from the yaw rate sensor is less than the yaw threshold; and
the minimum wheel speed is greater than the speed threshold.

5. The system for determining an angular position of a steerable wheel of a vehicle according to claim 1, wherein the second data set further includes:
a first steering angle derived from the data from the plurality of wheel speed sensors;
a second steering angle derived from data from the yaw rate sensor;
a sum of the first steering angle and the second steering angle; and
a difference between a maximum wheel speed and a minimum wheel speed, both obtained from data from the plurality of wheel speed sensors, and
the respective straight path conditions include an angle threshold, a sum angle threshold, a velocity threshold, a minimum threshold, and a maximum threshold.

6. The system for determining an angular position of a steerable wheel of a vehicle according to claim 5, wherein the controller is configured to compare the second data set by comparing:
the first steering angle to the angle threshold;
the second steering angle to the angle threshold;
a sum of the first steering angle and the second steering angle to a sum angle threshold;
a difference between a minimum wheel speed and a maximum wheel speed to a velocity threshold, where the minimum wheel speed and the maximum wheel speed are obtained from the data from the plurality of wheel speed sensors; and
data from at least one of the plurality wheel speed sensors to a maximum threshold and a minimum threshold.

7. The system for determining an angular position of a steerable wheel of a vehicle according to claim 6, wherein the controller is configured to determine a substantially straight path of travel condition when:
the first steering angle is less than the angle threshold;
the second steering angle is less than the angle threshold;
the sum is less than the sum angle threshold;
the difference is less than the velocity threshold; and
the data from the at least one of the plurality of wheel speed sensors is less than the maximum threshold and is greater than the minimum threshold.

8. The system for determining an angular position of a steerable wheel of a vehicle according to claim 1, wherein the controller is configured to compare the first data set to the respective straight path conditions simultaneously with the comparison of the second data set to the respective straight path conditions.

9. The system for determining an angular position of a steerable wheel of a vehicle according to claim 1, wherein the controller is configured to associate data acquired from the steering angle sensor with a neutral position by:
collecting a plurality of data samples from the steering angle sensor; and
processing the plurality of data samples to derive the neutral position.

10. The system for determining an angular position of a steerable wheel of a vehicle according to claim 9, wherein the controller is configured to process the plurality of data samples by:
discarding at least one sample of the plurality of data samples from the plurality of data samples if a difference between the at least one sample of the plurality of data samples and another sample of the plurality of data samples is greater than a predetermined value; and
equating the neutral position to an average of the plurality of data samples.

11. A system for controlling the performance of a vehicle including the system for determining an angular position of a steerable wheel of a vehicle according to claim 1, comprising:
a power source configured to produce torque, the steerable wheel being one of a pair of steerable wheels configured to be driven by the torque, and a second pair of wheels of the plurality of wheels configured to be selectively driven by the torque;
a first clutch assembly selectively connecting a first wheel of the second pair of wheels to the power source; and
a second clutch assembly selectively connecting a second wheel of the second pair of wheels to the power source; and
wherein the controller is in electrical communication with the first and second clutch assemblies and the controller is configured to:
determine a first steering angle based on data received from the plurality of wheel speed sensors until the controller associates data acquired from the steering angle sensor with the neutral position;
determine a second steering angle based on data received from the yaw rate sensor until the controller associates data acquired from the steering angle sensor with the neutral position;
select one of the first steering angle and the second steering angle until the controller associates data acquired from the steering angle sensor with the neutral position; and
modulate the clutch assemblies based on the selected one of the first steering angle and the second steering angle to vary transmission of torque from the power source to the second pair of wheels: and
modulate the clutch assemblies based on data from the steering angle sensor and the neutral position after the controller associates data acquired from the steering angle sensor with the neutral position.

12. The system for controlling the performance of a vehicle according to claim 11, wherein the controller is configured to select one of the first steering angle and the second steering angle by,
determining a first rate of change of the first steering angle with respect to time,
determining a second rate of change of the second steering angle with respect to time, selecting the first steering angle when the first steering angle is less than the second steering angle and the first rate of change is less than the second rate of change,
selecting the second steering angle when the second steering angle is less than the first steering angle and the second rate of change is less than the first rate of change,
selecting a previously selected one of the first steering angle and the second steering angle when the first steering angle is less than the second steering angle and the first rate of change is greater than or equal to the second rate of change, and
selecting a previously selected one of the first steering angle and the second steering angle when the first steering angle is greater than or equal to the second steering angle and the first rate of change is less than the second rate of change.

13. The system for controlling the performance of a vehicle according to claim 11, wherein the controller is configured to:
modulate the clutch assemblies equally when operating under a first set of conditions such that each clutch assembly transfers an equal amount of torque to a respective one of the second pair of wheels, and
modulate each clutch assembly independently when operating under a second set of conditions such that torque transferred by the first clutch assembly to the first wheel is greater than torque transferred by the second clutch assembly to the second wheel based on the selected one of the first steering angle, the second steering angle and the steering angle data.

14. A control system for an all-wheel drive powertrain of a vehicle having a power source configured to produce torque, a steerable pair of wheels configured to be driven by the torque, and a second pair of wheels configured to be selectively driven by the torque, the control system comprising:
a first clutch assembly selectively connecting a first wheel of the second pair of wheels to the power source; and
a second clutch assembly selectively connecting a second wheel of the second pair of wheels to the power source; and
the system for determining angular position according to claim 1;
wherein the controller is further configured to,
modulate the clutches according to the data from the steering angle sensor after the controller determines the neutral position, and
modulate the clutches according to the estimated steering angle until the controller determines the neutral position.

15. The control system for an all-wheel drive powertrain of a vehicle according to claim 14, wherein the controller is configured to determine the neutral position by:
comparing a first data set and a second data set to respective straight path conditions, wherein the first data set includes data from a yaw rate sensor and data from a lateral acceleration sensor and the second data set includes data from a plurality of wheel speed sensors;
determining a substantially straight path of travel condition when the comparison of at least one of the first data set and the second data set satisfies the respective straight path conditions; and
associating data acquired from a steering angle sensor with a neutral position when the controller determines the substantially straight path of travel condition.

16. The control system for an all-wheel drive powertrain of a vehicle according to claim 15, wherein the controller is configured to determine an estimated steering angle by:
determining a first steering angle based on data received from the plurality of wheel speed sensors;
determining a second steering angle based on data received from the yaw rate sensor; and selecting one of the first steering angle and the second steering angle.

17. A method for determining a steering angle of a steerable wheel of a vehicle having a plurality of wheels comprising:
comparing a first data set and a second data set to respective straight path conditions, wherein the first data set includes data from a yaw rate sensor, data from a lateral acceleration sensor, and at least one slip ratio derived from the data from the plurality of wheel speed sensors, the at least one slip ratio indicates the percent difference between speeds of a respective pair of the plurality of wheels, and the second data set includes data from a plurality of wheel speed sensors;
determining a substantially straight path of travel condition when the comparison of at least one of the first data set and the second data set satisfies the respective straight path conditions; and
associating data acquired from a steering angle sensor with a neutral position when the controller determines the substantially straight path of travel condition.

18. The method for determining a steering angle of a steerable wheel of a vehicle according to claim 17, wherein the first data set further includes:
longitudinal acceleration data;
the data from the lateral acceleration sensor;
the data from the yaw rate sensor; and
a minimum wheel speed selected from the data from the plurality of wheel speed sensors, and
the respective straight path conditions include a slip threshold, an acceleration threshold, a lateral threshold, a yaw threshold, and a speed threshold.

19. The method for determining a steering angle of a steerable wheel of a vehicle according to claim 18, wherein comparing the first data set includes:
comparing the at least one slip ratio to the slip threshold;
comparing the acceleration data to the acceleration threshold;
comparing the data from the lateral acceleration sensor to the lateral threshold;
comparing the data from the yaw rate sensor to the yaw threshold; and
comparing the minimum wheel speed to the speed threshold.

20. The method for determining a steering angle of a steerable wheel of a vehicle according to claim 19, wherein determining a substantially straight path includes determining a substantially straight path when:
the at least one slip ratio is less than the slip threshold;
the acceleration data is less than the acceleration threshold;
the data from the lateral acceleration sensor is less than the lateral threshold;
the data from the yaw rate sensor is less than the yaw threshold; and
the minimum wheel speed is greater than the speed threshold.

21. The method for determining a steering angle of a steerable wheel of a vehicle according to claim 17, wherein the second data set further includes:
a first steering angle derived from the data from the plurality of wheel speed sensors;
a second steering angle derived from the data from the yaw rate sensor;

the sum of the first steering angle and the second steering angle; and a difference between a maximum wheel speed and a minimum wheel speed, both selected from the data from the plurality of wheel speed sensors, wherein the respective straight path conditions include an angle threshold, a sum threshold, a velocity threshold, a minimum threshold, and a maximum threshold.

22. The method for determining a steering angle of a steerable wheel of a vehicle according to claim 21, wherein comparing the second data set further includes:

comparing the first steering angle to the angle threshold;
comparing the second steering angle to the angle threshold;
comparing the sum of the first steering angle and the second steering angle to the sum threshold;
comparing the difference between the minimum wheel speed and the maximum wheel speed to the velocity threshold, where the minimum wheel speed and the maximum wheel speed are obtained from the data from the plurality of wheel speed sensors; and
comparing data from at least one of the plurality wheel speed sensors to the maximum threshold and the minimum threshold.

23. The method for determining a steering angle of a steerable wheel of a vehicle according to claim 22, wherein determining a substantially straight path includes determining a substantially straight path when:

the first steering angle is less than the angle threshold;
the second steering angle is less than the angle threshold;
the sum is less than the sum threshold;
the difference between the minimum wheel speed and the maximum wheel speed is less than the velocity threshold; and
the data from the at least one of the plurality of wheel speed sensors is less than the maximum threshold and is greater than the minimum threshold.

24. The method for determining a steering angle of a steerable wheel of a vehicle according to claim 17, wherein comparing the first data set and the second data set includes comparing the first data set to the respective straight path conditions simultaneously with the comparison of the second data set to the respective straight path conditions.

25. A method for controlling the performance of a vehicle including the method for determining a steering angle of a steerable wheel of a vehicle according to claim 14, comprising:

providing a power source configured to produce torque, the steerable wheel being one of a pair of steerable wheels configured to be driven by the torque, and a second pair of wheels of the plurality of wheels configured to be selectively driven by the torque;
providing a first clutch assembly selectively connecting a first wheel of the second pair of wheels to the power source; and
providing a second clutch assembly selectively connecting a second wheel of the second pair of wheels to the power source; and
determining a first steering angle based on data received from the plurality of wheel speed sensors until the controller associates data acquired from the steering angle sensor with the neutral position;
determining a second steering angle based on data received from the yaw rate sensor until the controller associates data acquired from the steering angle sensor with the neutral position;
selecting one of the first steering angle and the second steering angle until the controller associates data acquired from the steering angle sensor with the neutral position; and
modulating the clutch assemblies based on the selected one of the first steering angle and the second steering angle to vary transmission of torque from the power source to the second pair of wheels: and
modulating the clutch assemblies based on data from the steering angle sensor and the neutral position after the controller associates data acquired from the steering angle sensor with the neutral position.

26. The method for controlling the performance of a vehicle according to claim 25, wherein selecting one of the first steering angle and the second steering angle includes:

determining a first rate of change of the first steering angle with respect to time,
determining a second rate of change of the second steering angle with respect to time,
selecting the first steering angle when the first steering angle is less than the second steering angle and the first rate of change is less than the second rate of change,
selecting the second steering angle when the second steering angle is less than the first steering angle and the second rate of change is less than the first rate of change,
selecting a previously selected one of the first steering angle and the second steering angle when the first steering angle is less than the second steering angle and the first rate of change is greater than or equal to the second rate of change, and
selecting a previously selected one of the first steering angle and the second steering angle when the first steering angle is greater than or equal to the second steering angle and the first rate of change is less than the second rate of change.

27. The method for controlling the performance of a vehicle according to claim 25, wherein modulating the clutch assemblies includes:

modulating the clutch assemblies equally such that each clutch assembly transfers an equal amount of torque to a respective one of the second pair of wheels, and
modulating each clutch assembly independently such that torque transferred by the first clutch assembly to the first wheel is greater than torque transferred by the second clutch assembly to the second wheel based on the selected one of the first steering angle, the second steering angle and the steering angle data.

28. A method for controlling an on-demand all-wheel drive system of a vehicle to supplement an operator's input to the vehicle comprising:

providing a power source, a pair of steerable wheels driven by the power source, a pair of rear wheels selectively driven by the power source, a pair of rear clutch assemblies selectively connecting a respective one of the pair of rear wheels to the power source, a yaw rate sensor configured to output data representative of an angular velocity of the vehicle about a vertical axis of the vehicle, a lateral acceleration sensor configured to output data indicative of an acceleration of the vehicle in a substantially transverse direction of the vehicle, and a plurality of wheel speed sensors configured to output data representative of a rotational speed of a respective one of the pair of steerable wheels and the pair of rear wheels, and a steering angle sensor configured to output data related to change in steering angle;
determining a neutral position for the steering angle sensor;

determining an estimated steering angle according to the method of claim 14 until the neutral position is determined;

modulating the clutches according to the data from the steering angle sensor after the neutral position is determined; and modulating the clutches according to the estimated steering angle until the neutral position is determined.

29. The method for controlling an on-demand all-wheel drive system according to claim 28, wherein determining a neutral position includes:

comparing a first data set and a second data set to respective straight path conditions, wherein the first data set includes data from the yaw rate sensor and data from the lateral acceleration sensor and the second data includes data from the plurality of wheel speed sensors;

determining a substantially straight path of travel condition when the comparison of at least one of the first data set and the second data set satisfies the respective straight path conditions; and associating data acquired from a steering angle sensor with a neutral position when the controller determines the substantially straight path of travel condition.

30. The method for controlling an on-demand all-wheel drive system according to claim 29, wherein determining an estimated steering angle includes:

determining a first steering angle based on data received from the plurality of wheel speed sensors;

determining a second steering angle based on data received from the yaw rate sensor; and selecting one of the first steering angle and the second steering angle.

* * * * *